United States Patent
Graber et al.

(10) Patent No.: US 6,534,958 B1
(45) Date of Patent: Mar. 18, 2003

(54) SYSTEM THAT SUPPLIES ELECTRICAL POWER AND COMPRESSED AIR WITH THROTTLE CONTROL

(75) Inventors: Tom M. Graber, Longmont, CO (US); Harold C. Scott, Lafayette, CO (US); Harold Todd Tyler, Kearney, NE (US); Timothy W. Burford, New Ulm, MN (US); Andrew J. Kopel, LaFayette, MN (US); Paul Joseph Klinek, New Ulm, MN (US)

(73) Assignee: Coleman Powermate, Inc., Kearney, NE (US)

( * ) Notice: Subject to any disclaimer, the term of this patent is extended or adjusted under 35 U.S.C. 154(b) by 0 days.

(21) Appl. No.: 09/637,538

(22) Filed: Aug. 11, 2000

Related U.S. Application Data

(60) Provisional application No. 60/149,373, filed on Aug. 16, 1999.

(51) Int. Cl.[7] .............................. H02K 5/00; B60L 1/02; F01K 15/00; F01K 17/02; F02B 63/00; F01P 9/00

(52) U.S. Cl. .............................. 322/11; 290/1 A; 290/2; 290/1 R; 417/360; 322/16; 322/1; 123/2; 123/41.01

(58) Field of Search .......................... 123/41.21, 198 E, 123/2; 700/287; 60/39.281, 627; 322/11; 417/360, 364; 290/1 A

(56) References Cited

U.S. PATENT DOCUMENTS

| | | | |
|---|---|---|---|
| 3,909,159 A | * | 9/1975 | Jansen et al. ............... 417/374 |
| 4,009,695 A | * | 3/1977 | Ule .......................... 123/90.13 |
| 4,166,439 A | * | 9/1979 | Golan ..................... 123/117 R |
| 4,173,951 A | | 11/1979 | Ishirhara ........................ 123/2 |
| 4,191,511 A | | 3/1980 | Stewart et al. ................. 417/18 |
| 4,232,997 A | | 11/1980 | Grimmer et al. ............... 417/4 |
| 4,275,558 A | * | 6/1981 | Hatch et al. ............ 60/39.16 R |
| 4,309,871 A | | 1/1982 | Venema .................. 60/39.28 R |
| 4,661,761 A | | 4/1987 | Katsumata |
| 4,722,673 A | * | 2/1988 | Grime et al. ................ 417/360 |
| 4,998,862 A | | 3/1991 | Hutchinson ................... 417/28 |
| 5,087,824 A | | 2/1992 | Nelson |
| 5,099,945 A | * | 3/1992 | Okui et al. .................. 180/297 |
| 5,186,142 A | * | 2/1993 | Brunelli et al. .............. 123/339 |

(List continued on next page.)

FOREIGN PATENT DOCUMENTS

| WO | WO 98/47217 | 10/1998 |
|---|---|---|

*Primary Examiner*—Nestor Ramirez
*Assistant Examiner*—Julia C. Gonzalez R.
(74) *Attorney, Agent, or Firm*—William R. Bachand; Squire, Sanders & Dempsey, L.L.P.

(57) ABSTRACT

A system provides electrical power and compressed air includes a wheeled hand truck frame, an engine, a compressor, a generator, and a reservoir having several horizontally disposed cylindrical tanks in fluid communication and arranged in one or a few vertical planes. A portion of a lower-most tank of the reservoir is below the plane including the axle for the wheels; and the respective centers of gravity of the engine, the fuel tank, and the reservoir are arranged for relatively greater stability. A control system for the engine, generator, and compressor provides priority response to air demand and/or priority response to electrical power demand by reducing lower priority loads on the engine prior to increasing engine speed. A throttle controller moves the engine throttle from high speed to low speed in response to low demand for compressed air in combination with low demand for electrical power. The throttle controller includes a low demand valve and throttle positioning air cylinder. The low demand valve is operated by an electrical signal asserted in response to detecting a condition of low output current from the system.

22 Claims, 21 Drawing Sheets

U.S. PATENT DOCUMENTS

| | | | |
|---|---|---|---|
| 5,224,836 A | | 7/1993 | Gunn et al. .................... 417/14 |
| 5,242,278 A | | 9/1993 | Vanderslice et al. ........ 417/364 |
| 5,341,644 A | * | 8/1994 | Nelson .......................... 123/2 |
| 5,399,072 A | * | 3/1995 | Westphal .................... 417/234 |
| 5,669,352 A | | 9/1997 | Mitchell |
| 5,713,340 A | * | 2/1998 | Vandenberghe et al. .... 123/682 |
| 6,028,369 A | * | 2/2000 | Hirose et al. ............. 123/41.01 |
| 6,051,809 A | | 4/2000 | Colella ........................ 219/133 |
| 6,072,302 A | * | 6/2000 | Underwood et al. .......... 322/17 |
| 6,084,313 A | * | 7/2000 | Frank ....................... 290/40 C |
| 6,202,782 B1 | * | 3/2001 | Hatanaka .................... 180/301 |

* cited by examiner

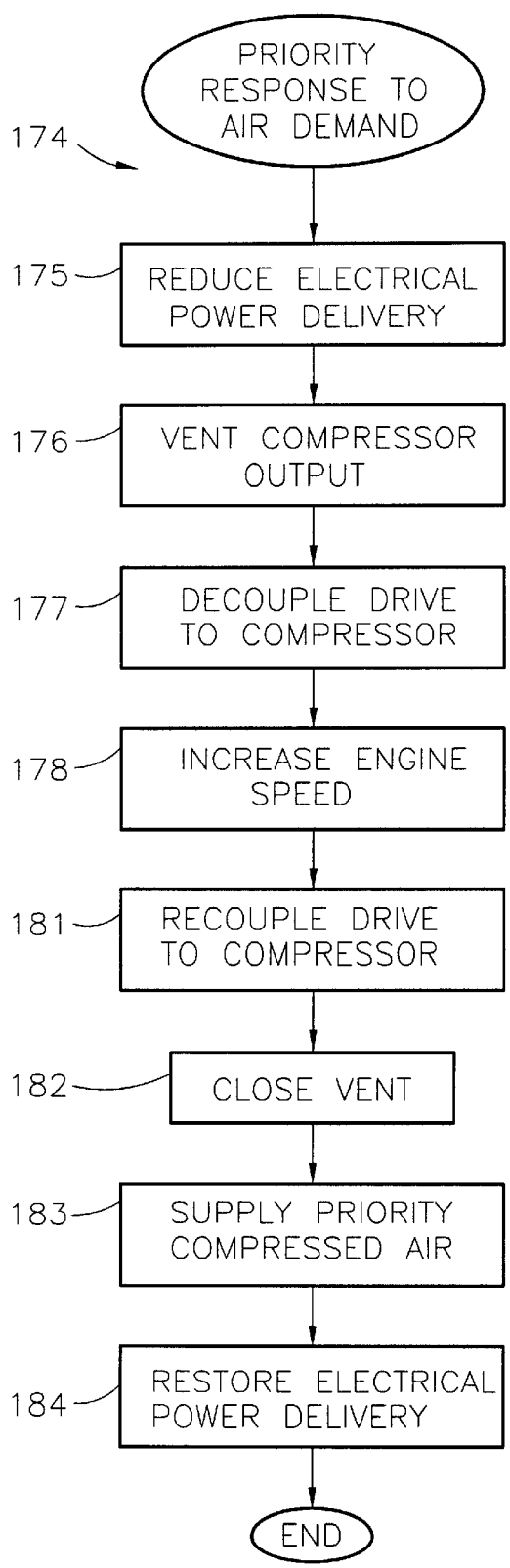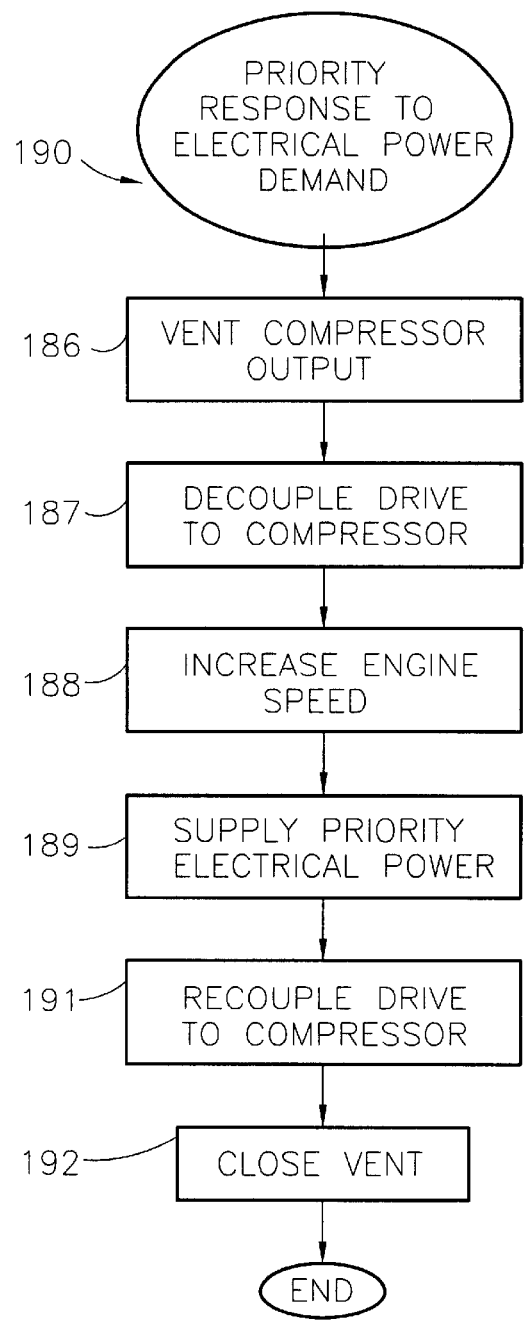
FIG. 2
FIG. 3

SYSTEM THAT SUPPLIES ELECTRICAL POWER AND COMPRESSED AIR WITH THROTTLE CONTROL

This application claims priority to US Provisional Patent Application No. 60/149,373 by Harold C. Scott and Tom Graber, entitled "Compressor Generator", filed Aug. 16, 1999.

BACKGROUND OF THE INVENTION

The present invention relates to systems for converting mechanical to electrical energy as well as providing a source of compressed air; and, more specifically, to such systems employing a relatively small engine.

In general, portable gen-sets comprising a generator and an engine, are well known. The generator typically comprises a rotor and stator arranged for relative rotation. Generally, the rotor is driven by the energy source, often mounted on the shaft of the engine. The rotor typically generates a magnetic field (using either permanent magnets or windings), which interacts with windings maintained on the stator. As the magnetic field intercepts the windings, an electrical current is generated. The induced current is typically applied to a bridge rectifier, sometimes regulated, and provided as an output. In some instances, the rectified signal is applied to an inverter to generate an AC output. Examples of portable gen-sets are described in U.S. Pat. No. 5,929,611 issued to Scott et al. on Jul. 27, 1999; U.S. Pat. No. 5,625,276 issued to Scott et al. on Apr. 29, 1997; U.S. Pat. No. 5,705,917 issued to Scott et al. on Jan. 6, 1998; U.S. Pat. No. 5,780,998 issued to Scott et al. on Jan. 14, 1998; U.S. Pat. No. 5,886,404 issued to Scott et al. on Mar. 23 1999; U.S. Pat. No. 5,900,722 issued to Scott et al. on May 4, 1999; and U.S. Pat. No. 5,929,611 issued to Scott et al. on Jan. 27, 1999, all commonly assigned with the present invention.

Portable power conversion systems find particular utility as: power sources for lights and small appliances used, for example, at construction or camping sites, or in connection with recreational vehicles; and vehicular battery charger/jump start units.

Portable compressor systems are also, in general, known. Such systems typically include: an engine; a compressor (typically a reciprocating piston pump); a drive system between the engine and the compressor; a transfer tube (conduit); a check valve; a storage reservoir (one or more tanks); a pressure regulator; and an output line terminating in an output valve. In general, the compressor intakes atmospheric air, and generates pressurized air, which is routed by the transfer conduit to the storage reservoir through the check valve. A reserve of pressurized air is thus developed in the storage reservoir. The regulator is typically disposed downstream of the storage reservoir, interposed between the reservoir and output line, with the intent that air is provided at the output valve at a predetermined regulated pressure.

These compressor systems include a mechanism for inhibiting flow of pressurized air into the reservoir once the reservoir attains a maximum pressure. They typically employ a vent valve communicating with the transfer tube on the compressor side of the check valve. When the reservoir pressure exceeds the predetermined maximum, the vent valve diverts the air from the compressor to atmosphere rather than into the reservoir. More specifically, the vent valve typically includes, or cooperates with, a pressure sensor to maintain the pressure in the reservoir within a predetermined acceptable range. The sensor is typically preset to toggle in response to upper and lower pressures in the reservoir, e.g., 100 and 130 PSI. When the reservoir is at or below the lower end of the acceptable pressure range (e.g., 100 PSI) the vent valve is closed and air from the compressor is directed into the reservoir. When the reservoir reaches the upper end of the range (e.g., 130 PSI) the vent valve is opened and air from the compressor is diverted to the atmosphere.

In many commercially available portable compressor systems, the engine operates at a constant speed (RPM) irrespective of air demand. However, compressor systems in which engine speed is varied between idle and a predetermined operating speed based upon air demand are known. In such systems, a transducer is typically used not only to control the vent valve but also to shuttle (e.g., pneumatically or mechanically) the engine throttle between idle and the predetermined operating speed positions. When the reservoir is at the lower end of the acceptable pressure range (e.g., 100 PSI) the transducer shuttles to close the vent valve and shuttles the throttle to the predetermined operating speed position. When the reservoir reaches the upper end of the range (e.g., 130 PSI) the vent valve is opened and the throttle is shuttled to a setting corresponding to idle.

Portable engine driven compressors wherein the rotational speed (angular velocity) of the engine is varied to accommodate changes in ambient conditions and reservoir pressure have been suggested. For example, U.S. Pat. No. 5,224,836 issued to Gunn et al. on Jul. 6, 1993 describes a system in which a microprocessor or microcomputer based controller receives inputs indicative of various operating temperatures, the inlet and discharge pressures of a compressor, and reservoir pressure, and adjusts the angular speed (RPM) of the engine to operate the engine at or near the minimum angular velocity (set point speed) capable of delivering a set point reservoir pressure. The set point speed is recalculated at relatively long intervals, i.e., approximately once every five minutes. While the compressor is delivering air at a selected discharge pressure and the engine is running at the set point speed, pressure control is achieved by modulation of the inlet valve of the compressor. If the reservoir set point pressure is not achievable with the engine operating at the set point speed, the engine is accelerated until either the reservoir set point pressure is achieved, or the compressor reaches a maximum operating speed. Adjustments to engine speed are effected using a proportional integral differential (PID) control function.

In systems where relatively large changes in engine speed are effected in accordance with air demand, e.g., toggling between idle and run speed, is desirable that the reservoir capacity be large enough and acceptable pressure range be wide enough to avoid short cycling between states; changing between states tends to cause increased wear on system components. Accordingly, conventional portable compressor systems typically employ relatively large reservoirs, e.g., 8 gallons capacity (typically two-gallon to four-gallon tanks, disposed horizontally in parallel underlying the compressor and engine), and a relatively wide range of acceptable pressures, e.g., 100 to 130 PSI.

Systems in which both a compressor and a generator are driven by a common engine have also been suggested. For example, an integral generator and compressor in which the armature of a generator is mounted on an extension of the rotor exclude shaft of a conventional dual rotary screw compressor is described in U.S. Pat. No. 5,242,278 issued Sep. 7, 1993 to Vanderslice et al. Further, the aforementioned U.S. Pat. No. 5,224,836 to Gunn et al. states that electronic controllers have been applied to control the angular velocity of internal combustion engine prime driver and compressor combinations which are coupled to also drive an electric generator, but that since the generator requires a substantially constant angular velocity for proper operation regardless of operating conditions, to maintain a constant frequency, the function of the controller for these internal combustion engine prime driver—centrifugal compressor—generator combinations is to produce a constant angular velocity under all conditions.

SUMMARY OF THE INVENTION

A system that provides electrical power and compressed air, according to various aspects of the present invention includes a support, an engine, a compressor, a generator, and a reservoir. The support maintains the system on a provided surface and may include wheels for portability as a hand truck. The engine may be selectively or directly coupled to the compressor. The generator is driven by the engine to provide the electrical power. A reservoir is coupled to the compressor and includes several horizontally disposed cylindrical tanks in fluid communication and arranged in one or a few vertical planes. A portion of a lower-most tank of the reservoir may be positioned below the engine; and the respective centers of gravity of the engine, the fuel tank, and the reservoir may be arranged for relatively greater stability.

A control system for the engine, generator, and compressor may provide priority response to air demand and/or priority response to electrical power demand by reducing lower priority loads on the engine prior to increasing engine speed. Consequently fuel may be conserved and run time increased.

A throttle controller moves the engine throttle from higher speed position(s) to lower speed position(s). For example, in response to low demand for compressed air in combination with low demand for electrical power, a throttle controller may move a two-position throttle. A throttle controller may include a low demand valve and throttle positioning air cylinder. The low demand valve may be operated by an electrical signal asserted in response to detecting a condition of low output current from the system.

BRIEF DESCRIPTION OF THE DRAWING

The preferred exemplary embodiment of the present invention will hereinafter be described in conjunction with the appended drawing, where like designations denote like elements, and:

FIG. 2 is a flow chart of a method for providing priority response to air demand performed, for example, by the system of FIG. 1;

FIG. 3 is a flow chart of a method for providing priority response to electrical power demand performed, for example, by the system of FIG. 1;

In the functional block diagrams mechanical, pneumatic, and electrical lines represent any conventional manner of implementing mechanical fluid, and electrical cooperation, such as integral physical assembly, direct coupling, or indirect coupling as through intermediate ports, tubes, conductors, transducers, or circuit components.

DETAILED DESCRIPTION OF EXEMPLARY EMBODIMENTS

Figure 1:
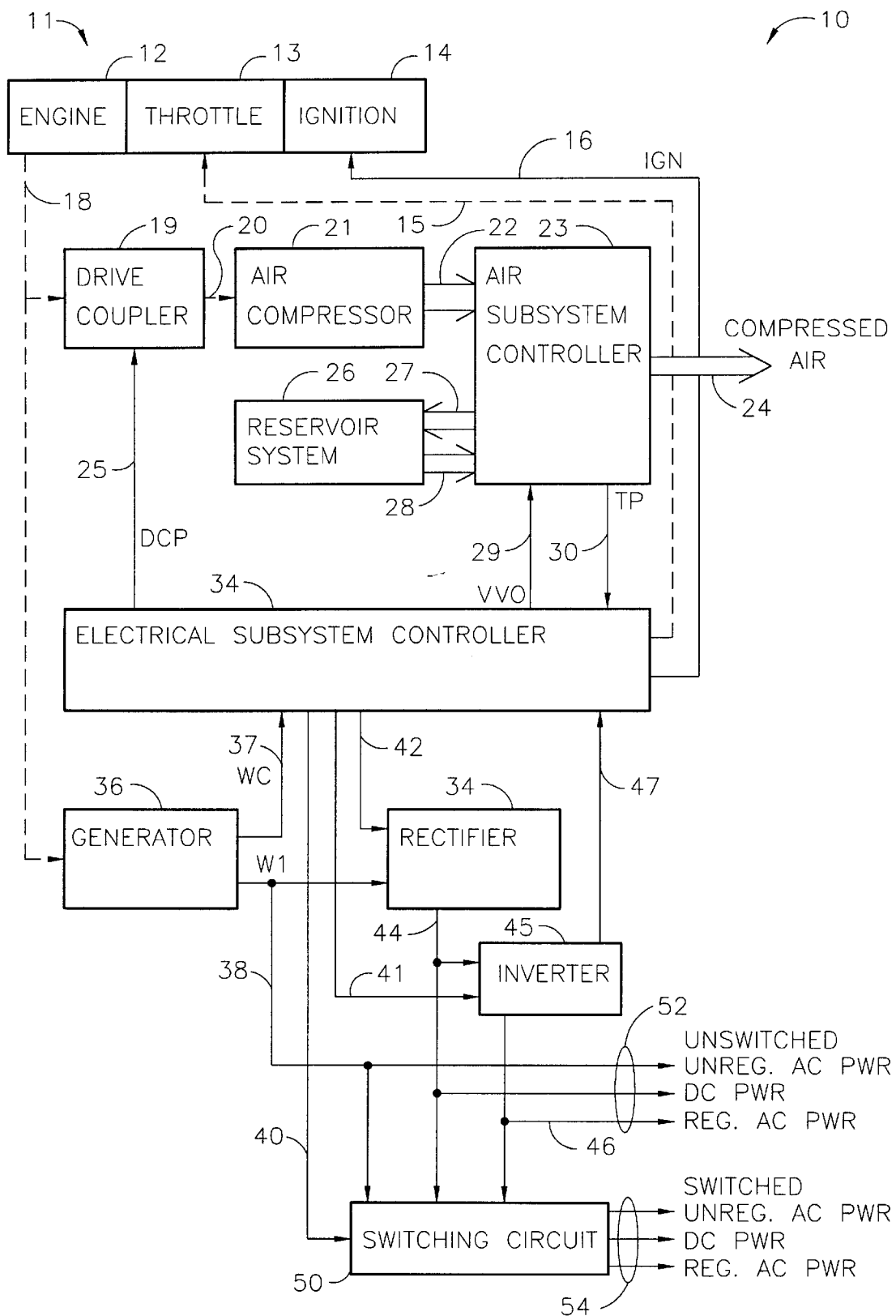
FIG. 1 is a functional block diagram of a system that provides electrical power and compressed air in accordance with various aspects of the present invention.

In systems according to various aspects of the present invention, engine speed is controlled to provide electrical power and to provide compressed air in a manner sufficient, for example, for operation of tools at a conventional building construction site. Control mechanisms and methods for such applications may be applied to achieve a relatively portable system supporting regulated power and compressed air for continuous periods. In other applications, control mechanisms and methods of the present invention may be applied to achieve lower fuel consumption or longer system run time without refueling while meeting demand for electrical power and compressed air within relatively narrow regulated tolerances of voltage, frequency, and pressure. For example, system 10 of FIG. 1 provides electrical power and compressed air. System 10 includes an engine assembly 11, a generator 36, and an air compressor 21.

Engine assembly 11 includes an engine 12, a throttle 13, and an ignition 14. Engine 12 may be any conventional engine (e.g., an internal combustion gasoline engine) suitable for use as a prime mover supplying rotational power via an output shaft. The position of throttle 13 determines engine speed (e.g., the RPM of the output shaft).

System 10 further includes drive train 18 that couples engine assembly 11 to drive coupler 19 and to generator 36. Drive train 18 may be any conventional mechanical drive apparatus suitable for use with engine 11. Preferably, engine assembly 11 provides an output shaft on which generator 36 receives rotational power and by which drive coupler 19 is directly coupled. Drive coupler 19 selectively couples engine 11 to air compressor 21. For example, when drive coupler 19 includes a belt drive, and compressor 21 is arranged for belt drive, drive train 18 may include a sheave directly coupled to the same shaft on which generator 36 receives power, a belt conveying rotational power from engine 11 to a sheave or fly wheel of compressor 21, and a conventional mechanism (e.g., an electrical solenoid or a pneumatic cylinder) that varies the tension in the belt to accomplish selective (e.g., on/off or proportional) coupling. In an alternate implementation, drive train may include any conventional clutch responsive to automatic control for selective coupling.

Pneumatic components of system 10 further include an air subsystem controller 23 that receives compressed air via line 22 as provided by air compressor 21, and a reservoir system coupled to controller 23 for receiving via line 27 compressed air to be stored in the reservoir and for providing via line 28 compressed air from the reservoir. Regulated compressed air is provided by system 10 via line 24 as an output of controller 23 via any suitable conventional connector(s) or nozzle(s). Conventional tubing or hose may be included with system 10 as suitable for an application or as desired. Controller 23 maintains the pressure of air in reservoir system 26 within a predetermined range, reports such pressure via an electrical signal TP on line 30, and responds to an electrical signal VVO on line 29 to open a vent valve when compressed air on line 22 is not being delivered via line 24 in sufficient volume and storage in reservoir system may increase tank pressure beyond the predetermined range.

Electrical components of system 10 include generator 36 having a power winding and a control winding and further include electrical subsystem controller 34, rectifier 39, inverter 45, and switching circuit 50. Electrical subsystem controller 34 receives electrical signals including: signal Wc on line 37 from the control winding of generator 36, from inverter 45 on line 47 indicia of output electrical power provided by system 10, and signal TP on line 30 from air subsystem controller 23 as discussed above. Electrical subsystem controller 34 responds to these input signals to provide electrical control signals to direct the operation of: drive coupler 19 (DCP on line 25), a vent valve as discussed above (VVO on line 29), throttle position (via link 15), ignition 14 (IGN on line 16), rectifier 39 (via line 42), inverter 45 (via line 41), and switching circuit 50.

Mechanical power (e.g., rotational power) is converted to electrical power by a generator. The term generator herein is used broadly to include any energy conversion machine including DC generator, AC generator (e.g., alternator) of the conventional types including active field coil and permanent magnet types. For example, generator 36 may be a brushless type having rotor coils excited by a resonant circuit. Generator 36 includes a power winding (e.g., a multiphase, high current winding) and a control winding (e.g., a single phase, low current winding). When engine 12 directly drives generator 36, the voltage across the control winding corresponds to engine RPM and reflects the combined mechanical loads presented by generator 36, drive coupler 19, and air compressor 21. Power from the power winding is provided to loads of system 10 (unswitched, unregulated AC power), to rectifier 39, and to switching circuit 50. The control winding is coupled to controller 34 as discussed above.

Conversion of alternating current to unipolar (e.g., haversine) current or direct current is accomplished by a rectifier circuit, herein called a rectifier. The voltage or current of the rectifier output may be regulated by the rectifier to reduce variation resulting from changes in engine speed and electrical loading (e.g., a load presented by inverter 45). For example, rectifier 39 may include any conventional rectifier circuit. Rectifier 39 receives on line 38 signal W1 from the power winding of generator 36. Rectifier converts received alternating current (e.g., three-phase current) to filtered DC power. Rectified power is provided via line 44 to loads of system 10 (unswitched unipolar or DC power), to inverter 45 and to switching circuit 50. In a preferred implementation, rectifier 39 receives signals for firing angle control and regulates, in any conventional manner, the provision of rectified power in accordance with timing related to the angle (phase) of each AC signal received from power winding signal W1. For example, when minimum firing angle controls are indicated by controller 34, the output rectified voltage on line 44 may be provided at a minimum magnitude.

Conversion of unipolar current to alternating current is accomplished by an inverter circuit, herein called an inverter. The alternating current signal provided by an inverter may have a frequency and amplitude that are controlled to relatively narrow ranges. For example, inverter 45 may include any conventional inverter circuit. Inverter 45 receives rectified power on line 44 as discussed above and provides alternating current power on line 46 to loads of system 10 (unswitched regulated AC power) and to switching circuit 50. Inverter 45 also provides on line 47 a signal responsive to (discrete or proportional) provided current, voltage, and/or power. Controller 34 is thereby made aware of changes in the demand for regulated AC power.

By providing connections for unswitched and switched loads, unswitched loads may be given priority over switched loads and compressed air loads. Such low priority switched electrical loads may include, for example, battery chargers, conventional heating, cooling, and ventilation systems, and auxiliary (e.g., non-emergency) lighting. A switching circuit disconnects switched loads as directed by an electrical subsystem controller or as determined appropriate with reference to available power and the magnitude of power being supplied to existing electrical loads (e.g., overcurrent, over/under voltage protection, etc.). For example, system 10 provides unswitched electrical power via lines 52 and switched electrical power via lines 54. Switching circuit 50 may include any conventional device (e.g., circuit breaker, contactor, relay, or semiconductor switch) for interrupting current to one or more switched loads. Switching circuit 50 may also include any conventional current, voltage, or power monitoring circuit coupled to selectively operate one or more such interruption devices. Switching circuit 50 receives unswitched power on lines 38, 44, and 46 (collectively lines 52) and respectively couples power from these lines to lines 54 in accordance with control signals received on line 40 from controller 34.

In operation, system 10 controls engine speed by positioning throttle 13 and/or affecting operation of ignition 14. Engine speed may be increased or reduced to provide two or more predetermined speeds (i.e., discrete control) or to provide any speed of a continuous range of speed (i.e. proportional control). Engine speed may be controlled for maximum provision of compressed air, for maximum provision of electrical power, for minimum fuel consumption or a weighted combination of these objectives. Electrical power may be reduced or stopped by suitable control signals (or absence of operative control signals) to rectifier 39 and/or switching circuit 50. Operation of air compressor 21 may be reduced or stopped by suitable control signals (or absence of operative control signals) to drive coupler 19 and/or air subsystem controller 23 (e.g., opening vent valve). Demand for compressed air may be anticipated by comparing reported tank pressure (signal TP) over time with performance parameters of drive coupler 19 and air compressor 21. Recording, analysis, and comparison of reported tank pressure, and performance parameters may be accomplished in any conventional manner suitable for performance by electrical subsystem controller 34. For example, controller 34 may include memory for tank pressure values, measurement times, and performance parameters. When a demand for pressurized air is determined to exist, controller 34 may seek to meet the demand in minimal time, with minimal fuel consumption, with minimal disruption of the provision of electrical power, or a prioritized or weighted combination of these goals. When a demand for electrical power is determined to exist as a result of monitoring signals provided by generator 36, and inverter 45, as discussed above, controller 34 may seek to meet the demand in minimum time, with minimal fuel consumption, with minimal disruption of the provision of compressed air, or a prioritized or weighted combination of these goals. Controller 34 includes conventional circuits and/or stored programming to accomplish meeting demands in accordance with predetermined sequences, timing, and the satisfaction of desired operating conditions (or lapse of delay) prior to proceeding with a sequence.

A demand for compressed air may be met by system 10 from time to time according to a method (174 of FIG. 2) for priority response to air demand. Method 174 is performed by controller 34 which determines that additional compressed air is being demanded in any manner. When demand is determined to exist and a suitable increase in engine 12 speed is anticipated to be able to meet the demand, the electrical power being provided by system 10 may be reduced (step 175) or stopped. For example, the output voltage may be reduced (lines 52 or 54) to a relatively low voltage (e.g., 90% of normal voltage) to reduce current being sourced to the load (e.g., a resistive load). Current may be stopped by operation of rectifier 39 or switching circuits 50 as discussed above.

The mechanical load presented by compressor 21 to engine 12, whether or not the compressor is currently in operation, may be reduced or eliminated. For example, the output of compressor 21 may be vented (step 176) and/or drive coupler 19 may be directed to decouple air compressor 21 (via drive 20) from drive train 18 (step 177) partially or in effect completely.

The load on engine 12 being reduced (by steps 175, 176, and/or 177), the engine speed may be further increased (step 178) by operation of throttle 13. A delay may be introduced to assure that engine speed is stable at a desired RPM prior to directing power to meet the demand for compressed air.

After beginning to increase engine speed (or after a target RPM or rate of increase in RPM has been reported), drive coupler 19 may be directed to recouple drive train 18 to drive train 20 (step 181). Engine 12 is presented with the inertial load of drive elements 19 and 20 and to some extent compressor 21. A suitable delay may be inserted here to permit engine speed to reach equilibrium driving the increased load.

When the vent valve is operated (step 182) to close the vent, the output compressed air from compressor 21 is provided to meet demand for compressed air (line 24) and/or establish higher tank pressure in reservoir system 26.

Supplying compressed air (step 183) while a minimal amount of engine power is being converted to electrical power allows system 10 an expedited recovery from low reservoir conditions and/or an ability to provide a greater volume of air at a desired pressure via line 24. Supplying may continue until an indication is given to return to continued provision of electrical power. Such a condition may include operation of an operator control (not shown), connection or operation (e.g., attempted operation) of a suitable cumulative electrical load, a suitable tank pressure being established, reduction of demand for compressed air, and/or lapse of a predetermined period of time, electrical power delivery is then restored (step 184) by reversing the actions taken at step 175.

A demand for electrical power may be met by system 10 from time to time according to a method (175 of FIG. 3) for priority response to electrical power demand. Method 175 is performed by controller 34 which determines that additional electrical power is being demanded in any manner. When demand is determined to exist and a suitable increase in engine 12 speed is anticipated to be able to meet the demand, power being provided by system 10 for compressing air may be reduced or stopped and engine speed may be increased by operation of throttle 13 (steps 186–188 as discussed above with reference to steps 176–178). For example, a vent valve may be operated to vent part or all of the output of air compressor 21.

Supplying electrical power while a minimal amount of engine power is being used for compressing air allows system 10 to provide a greater magnitude (higher current, higher wattage) of electrical power without delay, extended low voltage, or extended low current conditions. Undesirable interruption of current by switching circuit 50 may be avoided. Supplying may continue until an indication is given to return to continued provision of compressed air. Such a condition may include operation of an operator control (not shown), connection or operation (e.g., attempted operation) of a suitable cumulative compressed air load, a suitable low tank pressure being reported, increase in demand for compressed air, decrease in demand for electrical power, and/or lapse of a predetermined period of time. Provision of compressed air may then be restored (steps 191–192 as discussed above with reference to steps 181–182) by reversing the actions taken at steps 186–187.

By reducing the load on engine 12, engine speed may be increased a predetermined amount in a relatively shorter time and with relatively less fuel consumption.

Figure 4A:
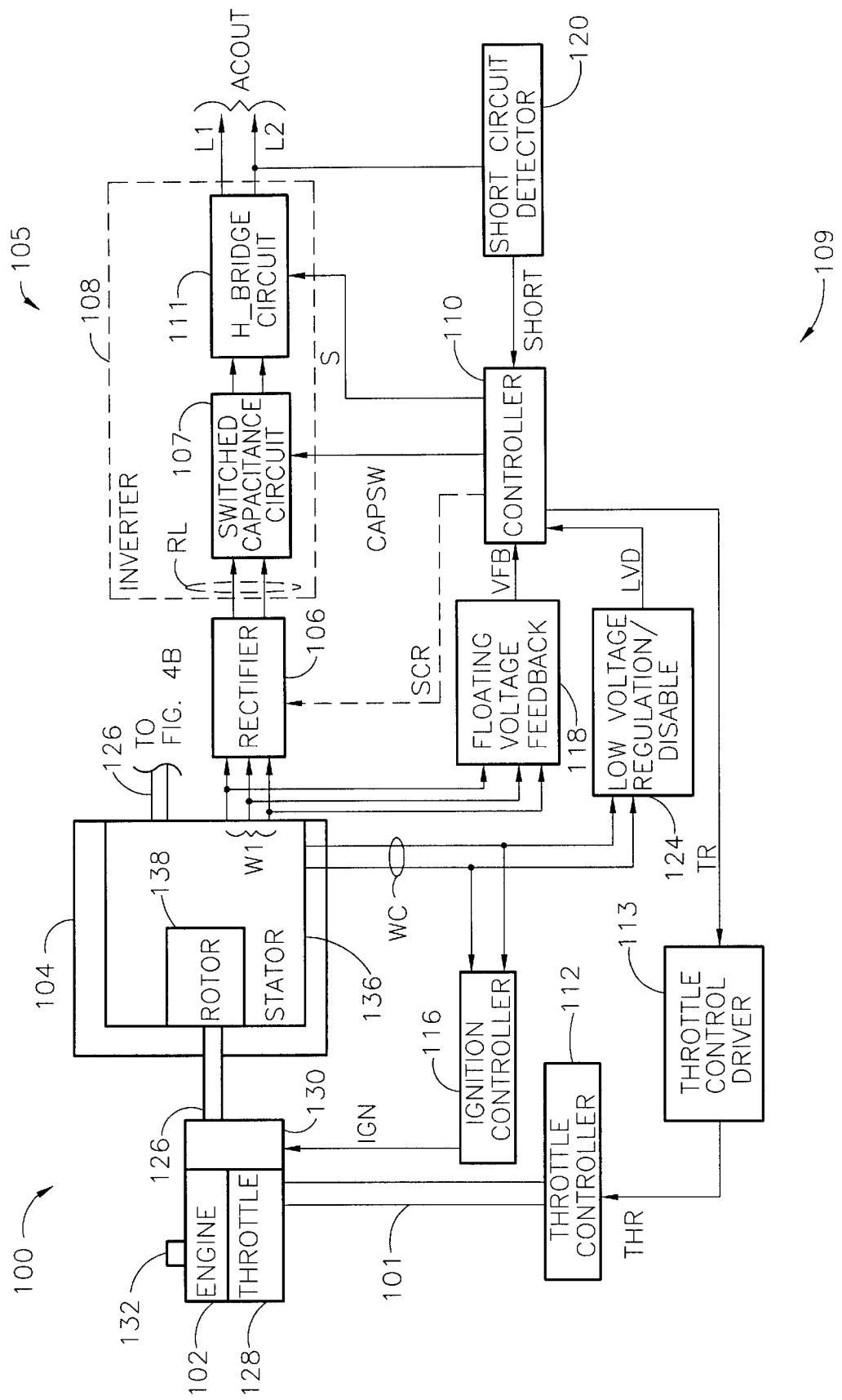
FIGS. 4A and 4B form a functional block diagram of a system in accordance with various aspects of the present invention discussed with reference to the system of FIG. 1.
Figure 4B:
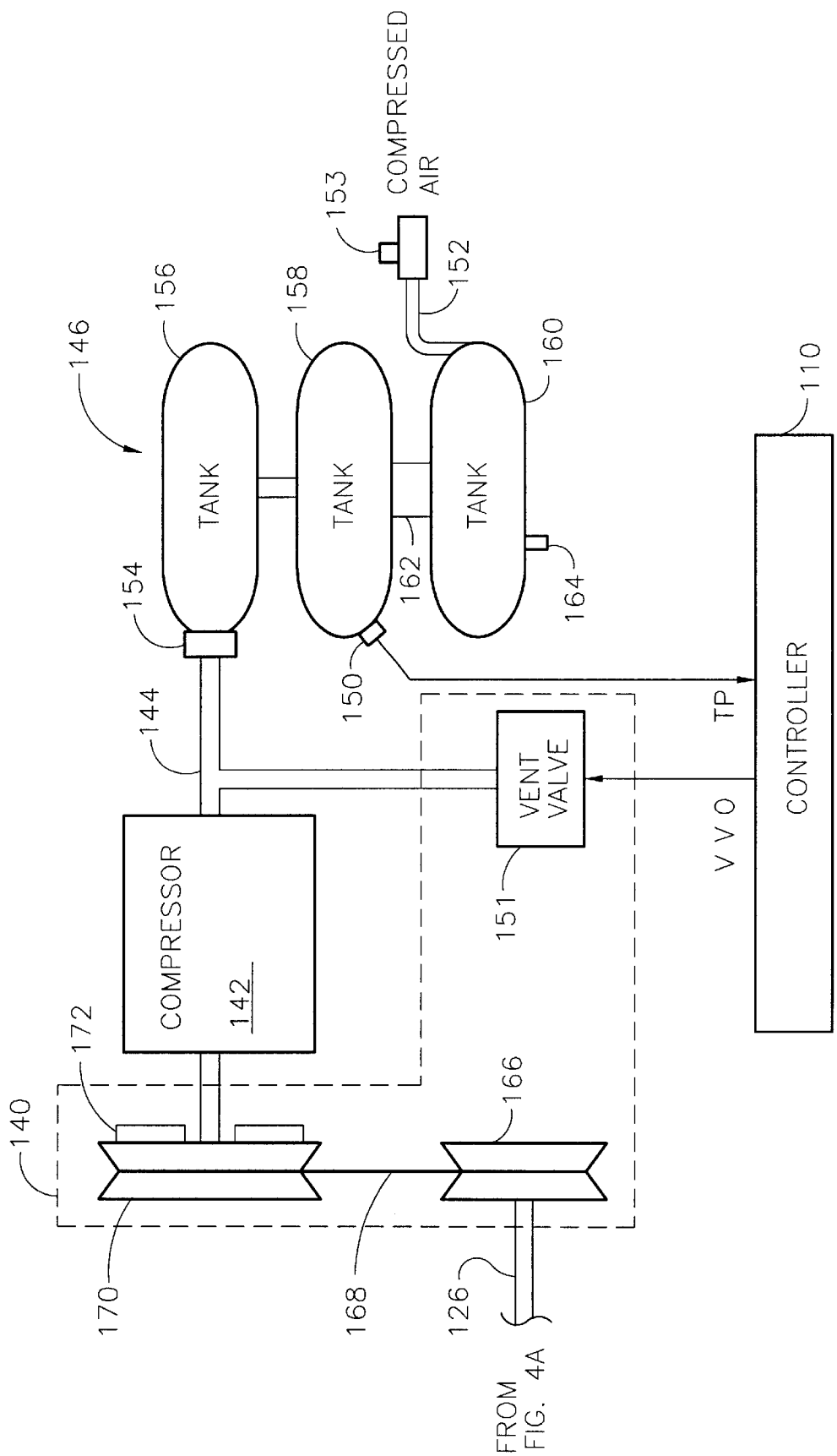

Particular advantages may be realized in an implementation of system 10 adapted, among other purposes, for ease of transportation. Relatively light weight and relatively powerful components may be arranged as described below with reference to system 100 of FIGS. 4A–4B. System 100, in accordance with various aspects of the present invention, suitably comprises: an engine 102; an alternator 104; a power converter circuit 105 providing an output at terminals L1 and L2; control circuit 109, a throttle control apparatus 112, a selectively actuable drive system 140, a compressor 142, a conduit (e.g., transfer tube) 144, a reservoir system 146, a pressure transducer 150, an output (service) line 152, and output (service) valve 153.

As will be more fully discussed, in the preferred embodiment: converter circuit 105 comprises a rectifier 106 and an inverter 108; control circuit 109 comprises a controller 110, a throttle control driver 113, an ignition controller 116, a voltage feedback circuit 118, a short circuit detection circuit 120, and a low voltage regulation/disable circuit 124; reservoir system 146 comprises a check valve 154, a predetermined number, e.g., 3 of tanks 156, 158, and 160, a pressure regulator 162, and a drain 164; and drive system 140 comprises a sheave 166, a connecting link, e.g., belt, 168, a flywheel 170 and a vent (blow off) valve 151.

System 100 preferably generates, across terminals L1 and L2, an AC output signal (ACOUT) suitable for powering, lights, appliances and power tools (e.g., 120 volts, 60 Hz), and, at output valve 153, compressed air at a predetermined pressure (e.g., 90 PSI). Engine 102 drives alternator 104, and, through drive system 140, compressor 142. Alternator 104 and converter 105 cooperate to provide output signal ACOUT. Compressor 142 provides pressurized air through transfer conduit 144 to reservoir 146, which in turn makes pressurized air available at output valve 153. Drive system 140 also provides for inhibiting flow of pressurized air flow into the reservoir once the reservoir attains a maximum pressure, (e.g., vent valve 151). Control circuit 109 derives or receives feedback signals indicative of system operation and generates control signals to converter 105, throttle control 112 and drive system 140. Primary control of reservoir pressure is effected through feedback control of the throttle setting and selective application of pressurized air to reservoir 146, e.g., in the illustrated implementation, by deactivation of vent valve 151. Primary control of output signal ACOUT is effected through feedback control of the throttle setting; and regulation in rectifier 106, by e.g., varying firing angle (pulse width) or pulse population (number of pulses per unit time). In addition, in the preferred embodiment, ignition controller 116 is provided to prevent the speed of engine 102 from exceeding a predetermined limit to prevent e.g., instances of perceived engine runaway upon abrupt changes in AC load.

Engine 102 preferably comprises an internal combustion engine, including a rotational output shaft 126, a throttle mechanism 128, a magneto 130, and a spark plug 132. Engine 102 is preferably small, high RPM, and with a relatively fast response time relative to changes in throttle setting. Engine shaft 126 rotates at a speed in accordance with the setting of throttle 128.

Figure 9:
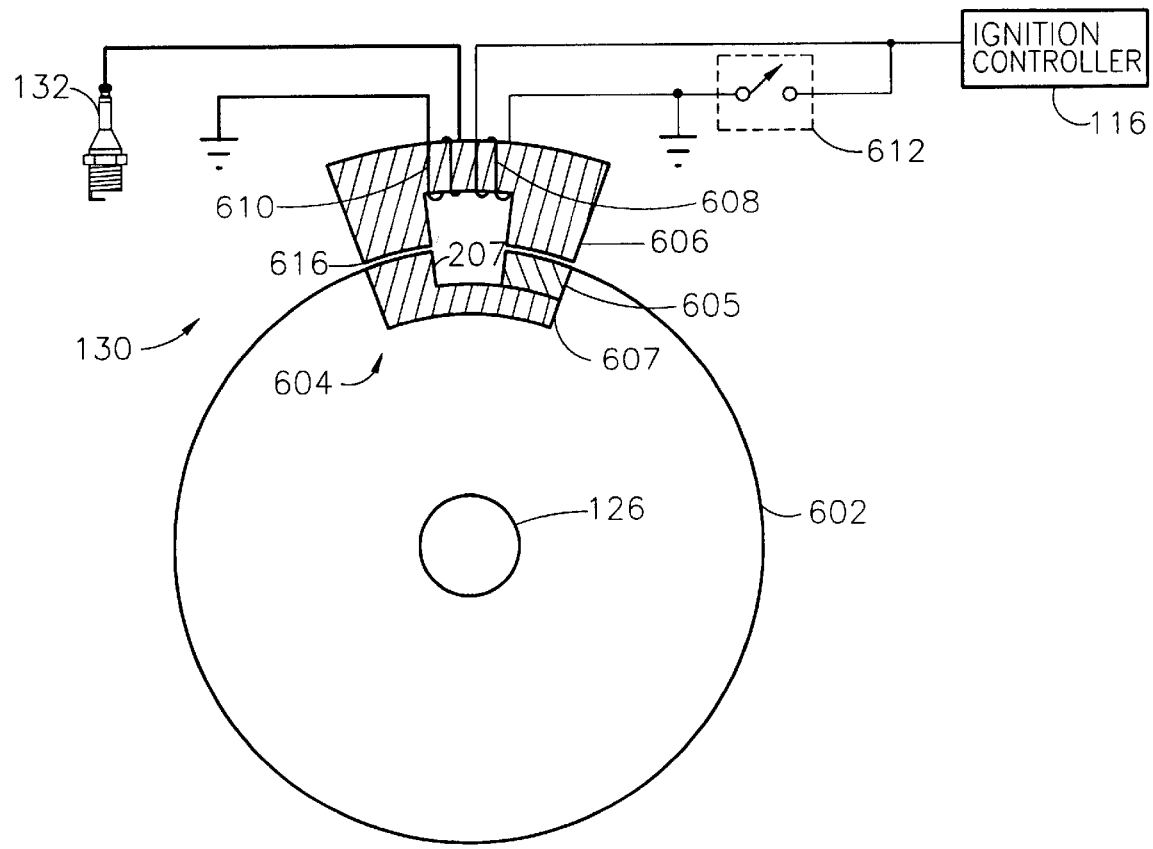
FIG. 9 is a functional block diagram of an ignition controller and magneto for use in the system of FIGS. 4A and 4B.
Figure 10:
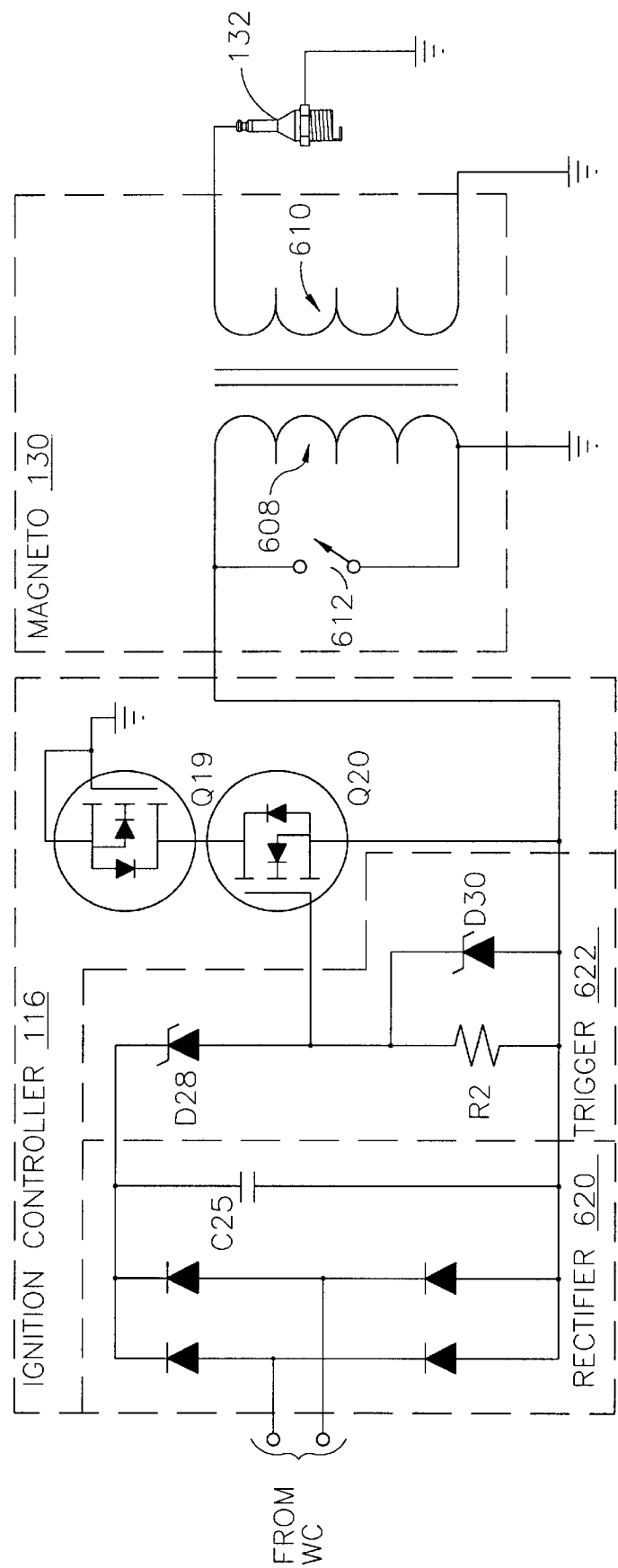
FIG. 10 is an electrical schematic diagram of an ignition controller and magneto for use in the system of FIGS. 4A and 4B.

Magneto 130 is employed to selectively generate a very high voltage across sparkplug 132 at a predetermined point in the engine cycle, facilitating timed generation of an arc (spark). Referring briefly to FIGS. 9–10, a conventional magneto typically includes: a fly wheel 602, mounted for rotation with engine shaft 126 and including magnetic components 604 such as a permanent magnet 605 and a magnetically soft material portion 607 (forming a consequence pole); a stationary magnetically soft material core 606 having a primary coil 608, and a high voltage secondary coil 610 wound thereon; and a switch 612. Core 606 is disposed proximate to fly wheel 602, separated by a predetermined air gap 616 such that the core and magnetically soft portion of flywheel 602 periodically align to form a magnetic path at a predetermined point in the compression cycle of engine 102. Primary coil 608, suitably comprising a relatively small number of turns of wire, cooperates with switch 612 and ignition controller 116. Secondary coil 610, suitably comprising a relatively large number of turns of fine wire, is connected to spark plug 132. Switch 612, disposed to selectively disrupt current flow in the primary coil, is suitably a mechanical switch (points) activated by a cam lobe in synchronism with the operation of engine 102, or an electronic switch (as used in connection with electronic ignition). As the magneto flywheel rotates and the magnetic poles pass the core, a varying magnetic field is created in the magnetic path formed through the flywheel soft magnetic material portion and the core. At the appropriate point for efficient fuel ignition in the compression cycle of engine 102, the moving magnetic components and stationary core come into approximate alignment and the switch is opened to disrupt the current flow in the primary coil. The magneto coils 608 and 610, in effect, attempt to maintain a continuing current. Accordingly, when the current through the primary coil is interrupted, and the magnetic field collapses, a very high voltage is induced in the secondary coil, causing sparkplug 132 to generate an arc (spark). As will be discussed, ignition controller 116 selectively attenuates pulses on the primary coil to decrease the spark voltage generated by plug 132.

Throttle control mechanism 112 controls the throttle (speed) setting of engine 102 in accordance with control signals from control circuit 109 (e.g., controller 110). Throttle control apparatus 112 may comprise any device capable of controlling the throttle (speed) setting of engine 102. Often, engine speed is controlled by varying the physical angle of a throttle plate or valve pivotally mounted in the engine carburetor (or in connection with a fuel injection system). The larger the angle of the plate, the larger the opening of the throttle, and the faster the speed (RPM) of the engine. Throttle control apparatus 112 suitably comprises an electromechanical actuator, responsive to control signals from controller 110 applied thereto (or to driver circuit 113 associated therewith) for controlling the setting of the throttle through a suitable coupling mechanism e.g., shaft 101. Examples of suitable control devices and coupling mechanisms are described in the aforementioned U.S. Pat. No. 5,886,404 (issued Mar. 23, 1999).

Throttle control 112 preferably comprises a conventional stepper motor mechanically coupled to the engine throttle. A mechanical coupling may be effected by, for example, a direct drive, a mechanical linkage, or a cam drive. A stepper motor typically comprises a rotor coupled to a shaft, cooperating with respective stator coils. The rotor includes a predetermined number of poles, preferably formed of permanent magnets. Windings, provided power through a conventional slip ring or brush mechanism, can also be utilized. Incremental rotation of the rotor is effected by establishing current paths through the stepper coils in predetermined sequences to generate magnetic fields which interact with the magnetic components of the rotor, and cause the rotor to move in predetermined increments. The poles of the stepper rotor tend to move into alignment with the coils through which current is flowing. The stepper motor may be operated either in a single activate winding (low power) mode or in paired winding (high torque) mode.

Alternator 104 converts mechanical energy, e.g., the rotation of engine shaft 126, into electrical energy. Alternator 104 suitably includes a multi-winding stator 136 and a rotor 138, disposed such that rotation of rotor 138 induces a current in the windings of stator 136. Rotor 138 is suitably mounted for rotation with engine shaft 126, with stator 136 mounted on the engine chassis coaxially about rotor 138.

Stator 136 preferably includes a laminate core, one or more multi-phase, e.g., 3-phase, windings, W1, and a single phase control winding Wc. Control winding Wc is suitably wound concurrently on the stator core with a predetermined one of the phases of one of the multi-phase windings, e.g., W1. Although physically wound with, e.g., a phase of winding W1, control winding Wc is operatively connected in the system irrespective of the status of the winding with which it is wound. Each stator winding includes a predetermined number of turns corresponding to the voltage output associated with that winding: winding W1 includes e.g., 11 turns per phase and control winding Wc includes e.g., 5 turns. If desired, respective portions of the windings can be switched in and out of the operative circuit to vary the effective number of turns of the windings. A suitable stator is described in U.S. Pat. No. 5,886,404 (issued Mar. 23, 1999). Stator windings W1 and Wc provide AC signals with a frequency in accordance with engine RPM. As will be discussed, the AC signals from winding W1 are applied to converter circuit 105 (e.g., rectifier 106) and control circuit 109 including voltage feedback circuit 118. The AC signals from winding WC are applied to control circuit 109 including low voltage detector 124, and ignition controller 116.

Rotor 138 is preferably a permanent magnet rotor employing high energy product magnets (e.g., flux density on the order of 3–4, and preferably 5 kilogauss) and consequence poles, and of sufficiently light weight that it can be maintained in axial alignment with, and rotated in close proximity to, stator 136 (i.e., with a relatively small predetermined air gap, in the range of, for example, 0.02 to 0.06 inch, and preferably 0.03 inch) without the necessity of any bearings in addition to those conventionally included in engine 102. Engine shaft 126 is also coupled to drive mechanism 140 (e.g., sheave pulley 166). Accordingly, to avoid the extra expense of bearings beyond those internal to engine 102, it is particularly desirable that rotor 138 be relatively light.

Figure 5A:
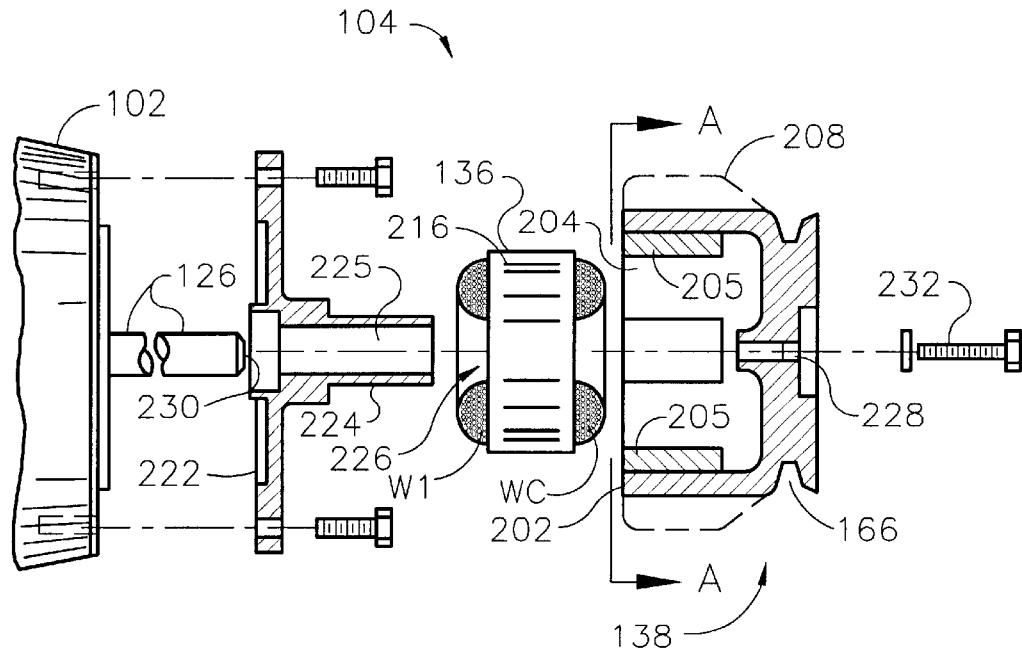
FIG. 5A is an exploded side sectional view of a generator assembly using an external rotor for use in the system of FIGS. 4A and 4B.
Figure 5B:
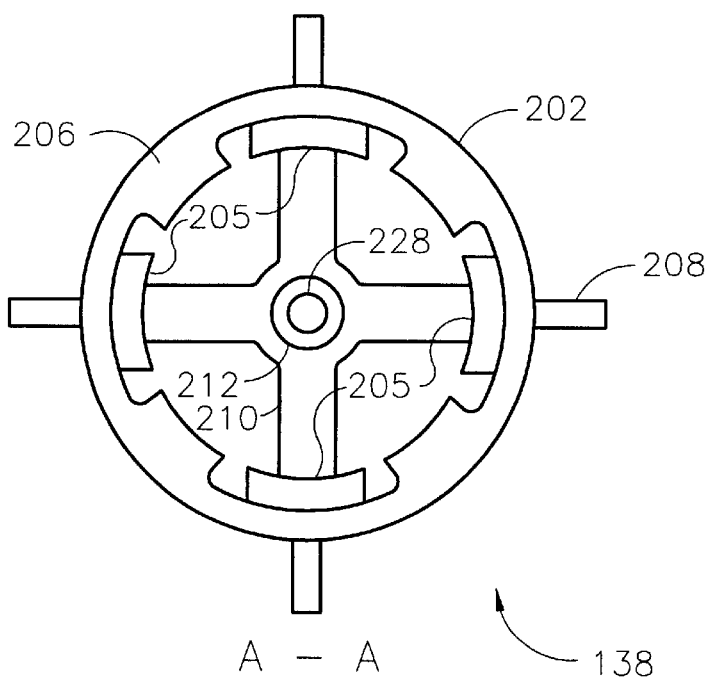
FIG. 5B is the cross sectional view A—A identified in FIG. 5A.

In some instances, weight and size advantages can be obtained by employing an external rotor disposed to rotate around the perimeter of an internally disposed stator. Referring briefly to FIGS. 5A and 5B, an external rotor 138 suitably comprises a cylindrical casing 202 formed of soft magnetic material, having an internal cavity 204. Alternating permanent magnets 205 and consequence poles 206 are disposed in the interior side wall of casing 202. If desired, respective fans (fan blades) 208 can be formed on the exterior side walls of casing 202, to facilitate cooling. Likewise, the top of casing 202 is substantially open, including respective cross-arms 210 and a central hub 212 to provide for connection to motor shaft 126. If desired, cross arms 210 can also be configured as fan blades, to facilitate cooling interior chamber 204. In addition, if desired sheave pulley 166 may be integrally formed in casing 202.

Stator 136 suitably comprises a laminate core 216 and respective windings W1 and Wc. Core 216 includes a central axial through-bore 226. Stator 136 is secured to engine 102 by a mount 222. Mount 222 includes a central axial stem 224 with an internal bore 225. In assembly, mount 222 is bolted to engine 102 with engine shaft 126 journaled through bore 225. Bore 225 is somewhat larger in diameter than is motor shaft 126, so that motor shaft 126 can rotate freely therein. Stator 136 is disposed on mount 222, with stem 224 received in central bore 226. Stem 224 suitably effects on interference fit with bore 226 although, adhesive can also be used, if desired.

Rotor 138 is disposed over stator 136 and fastened to engine shaft 126. Stator 136 is received within the interior of cavity 204. Hub 212 includes a central bore 228 disposed in registry with a threaded axial bore 230 in motor shaft 126. A bolt 232 is received through bore 228 and engaged in threaded bore 230 to fasten rotor 138 to shaft 126 for rotation therewith.

Alternatively, in some circumstances, an external rotor 138 can be formed as part of flywheel 170, concentrically disposed within the flywheel, with an interposed clutch mechanism. In such case, sheave pulley 166 would be mounted on engine shaft 126.

Referring again to FIG. 4A, converter circuit 105 converts the variable frequency AC signals from winding W1 of alternator 104 into output signals having predetermined characteristics, e.g., 120 volts, at 60 Hz. As noted above, converter 105, in the preferred embodiment, comprises switching rectifier 106 and inverter 108.

Figure 6:
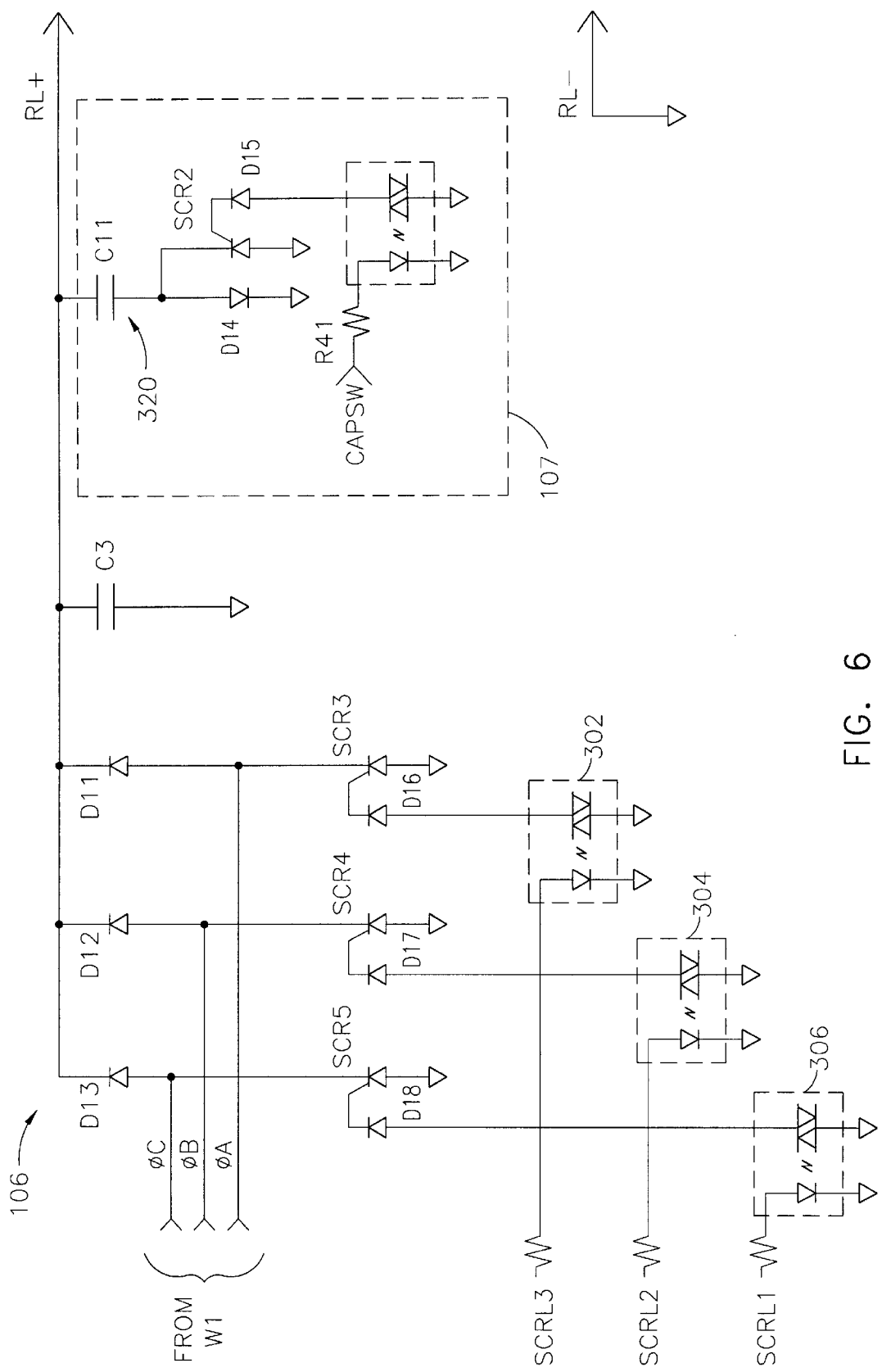
FIG. 6 is a functional block diagram of a rectifier and switched capacitor for use in the system of FIGS. 4A and 4B.
Figure 7:
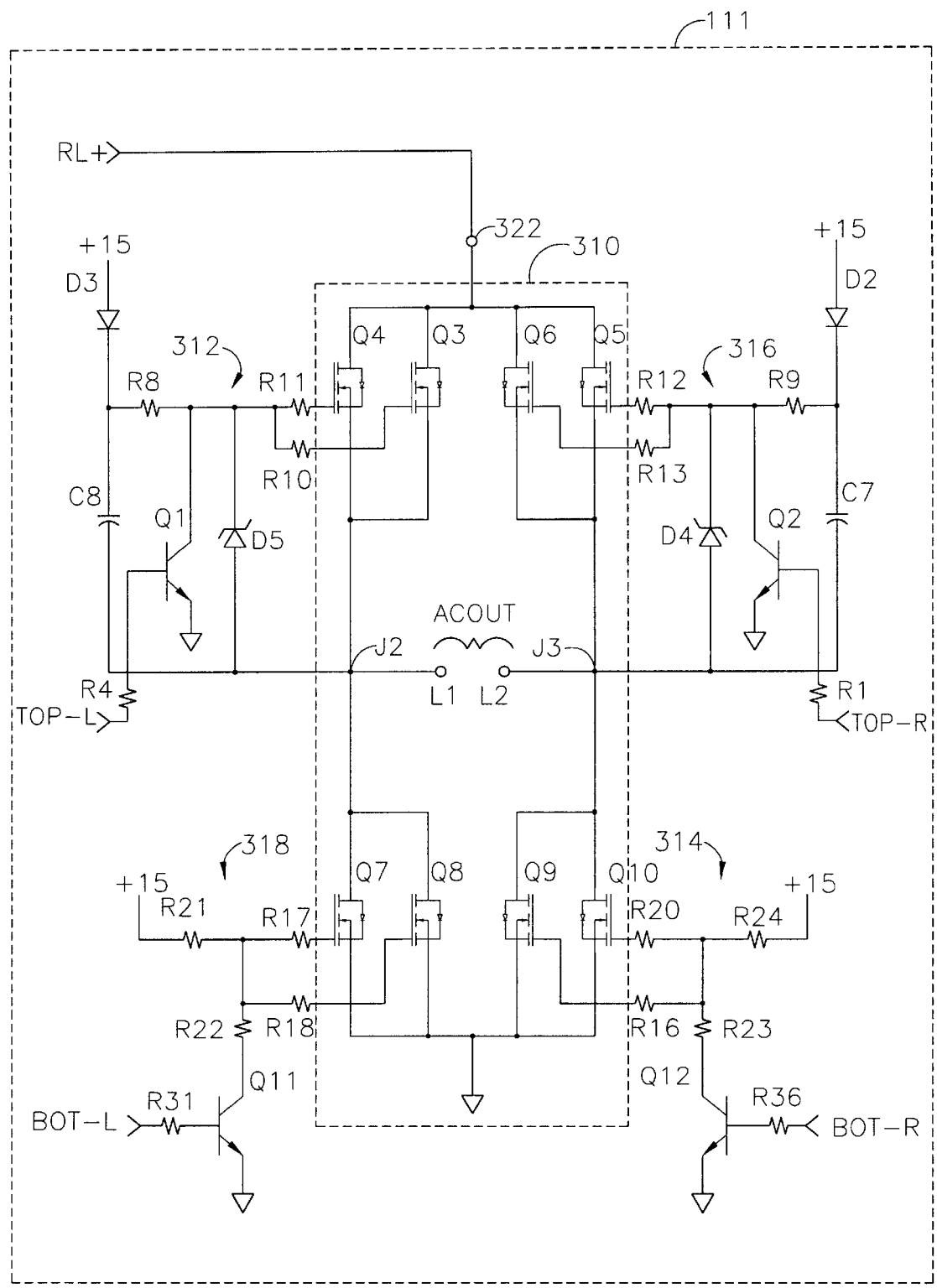
FIG. 7 is an electrical schematic diagram of an inverter for use in the system of FIGS. 4A and 4B.

Rectifier 106 selectively effects current paths through stator winding W1 of alternator 104, to generate one or more uni-polar inverter rail signals (RL) for application to inverter 108. Rectifier 106 is preferably at least partially switched/controlled to provide voltage regulation for output RL. In the preferred embodiment, rectifier 106 provides phase regulation to permit maximum independence of the AC output signal from compressor demands. For example, referring to FIG. 6, rectifier 106 may comprise a controlled rectifier responsive to control signals (SCRL1, SCRL2, SCRL3) from control circuit 109 (controller 110), e.g., a rectifier bridge having a respective leg associated with each phase comprising: a power diode (D11, D12, D13); a connecting switch or relay (e.g., SCR3, SCR4, SCR5); and a trigger circuit (302, 304, 306). The anodes of diodes D11, D12, D13 are connected to the respective phases of winding W1, and the cathodes are tied in common to an inverter rail (RL). The cathodes of SCRs (SCR3, SCR4, and SCR5) are connected to the respective phases of winding W1 and the anodes connected to system ground. The gates of SCR3, SCR4, and SCR5 are coupled to trigger circuits 302, 304, and 306. Trigger circuits 302, 304, and 306 suitably comprise an opto-coupler and a diode. When a control signal is applied to the opto-coupler LED, the opto-coupler photo element is rendered conductive, current flows through the diode, and current is injected into the control electrode (gate) of the SCR. The SCR is thus rendered conductive, and remains on until commutated off by the amplitude of the associated phase of the signal from winding W1.

Control of the DC output level (and AC output) may be effected by varying the point in the rotor cycle at which the SCR associated with each phase is triggered (the firing angle). This varies the percentage of the rotor cycle during which windings are activated and the pulse width of the signal generated by that phase. Control circuit 109 (including controller 110) provides signals SCRL1, SCRL2, and SCRL3 to trigger circuits 302, 304, and 306 of rectifier 106 to adjust the relative firing angles of the respective phases to control voltage output. Rotor 138 and stator 136 are suitably designed to generate an AC output signal meeting certain criteria even at the lowest operational rotor RPM (e.g., idle speed). At the minimum operational engine speed, the rectifier SCRs are "full on" for maximum firing angle. The SCR firing angles are varied to attain and maintain the desired output voltage at higher RPM. If desired, respective portions of the windings can also be switched in and out of the operative circuit to vary the effective number of turns of the windings and vary the overall current and voltage output.

Inverter 108, receives uni-polar inverter rail voltages (RL) and derives, responsive to control signals (S) from controller 110, a simulated AC voltage output signal ACOUT at output terminals L1 and L2 (e.g., an AC receptacle). In general, inverter 108 may comprise any device capable of generating an AC signal of predetermined amplitude and frequency from inverter rail signal RL. Suitable inverters are described in copending application Ser. No. 09/276,615 filed on Mar. 25, 1999 by Scott et al., entitled "Energy Conversion System Employing Stabilized Half-bridge Inverter," and commonly assigned with the present invention; and, commonly assigned Scott et al. patents: U.S. Pat. No. 5,625,276 (issued Apr. 29, 1997); U.S. Pat. No. 5,900,722 (issued May 4, 1999) and U.S. Pat. No. 5,886,404 (issued Mar. 23, 1999). For example, inverter 108 suitably comprises a switched capacitor inverter of the type described in U.S. Pat. No. 5,900,722 (issued May 4, 1999) in conjunction with FIGS. 27–29 of that patent. More specifically, with reference to FIGS. 4A, 4B, 6 and 7, inverter 108 suitably comprises an H bridge configuration of switching devices 111 with cooperating firing circuits 312–318 and a switched capacitance 320. H bridge 111 suitably comprises four pairs of parallel MOSFET power switches: top-left Q3/Q4, bottom right Q9/Q10, top-right Q5/Q6, and bottom-left Q7/Q8. Firing circuits 312–318, responsive to respective control signals (Top-L, Bot-R, Top-R, Bot-L) from controller 110 selectively render the switching devices conductive to effect current paths between (a) a juncture node 322 (e.g., RL) and one of converter output terminals L1, L2, and (b) between the common rail (system ground) and the other of converter output terminals L1, L2. High-side firing circuits 312 and 316 are preferably isolated and low-side firing circuits 314 and 318 are preferably non-isolated. Firing circuits 312–318 are suitably negative logic, i.e., the switches of H bridge 111 are normally conductive, and rendered nonconductive by a positive control signal. For example, the gates of MOSFETs Q3/Q4 are biased to render MOSFETs Q3/Q4 conductive in the absence of a positive Top-L control signal. When a positive Top-L control signal is applied, transistor Q1 is rendered conductive, pulling the gates of MOSFETs Q3/Q4 to ground, turning them off.

By alternately generating switching signals (Top-L, Bot-R) and (Top-R, Bot-L) a simulated sine wave can be produced. The RMS value of the signal can be controlled by the inclusion of a "dead time" between turning off one pair of drivers (e.g., Top-L, Bot-R) and the turning on of the opposing pair (e.g., Top-R, Bot-L). Control of the dead time in relationship to the voltage levels provides an RMS value approximately equal to that of the desired sine wave. Switched capacitor (filter) 320 selectively couples a capacitance (filter) C11 into the operative circuit only during a predetermined portion of the output signal cycle to shape the wave form to render the rising and falling edges gradual, more closely simulating a sine wave, as opposed to sharp rising and falling edges normally occurring in a square wave type inverter. For example, switched capacitor 320 is effectively removed from the operative circuit during portions of the cycle corresponding to rising and falling edges of the output wave form. With switched capacitor 320 effectively removed, the signal provided across output signals L1 and L2 is effectively the raw output of rectifier 106, i.e., a full wave rectified signal combining the outputs of the respective phases. The impedance apparent to the output terminals is effectively that of the alternator coils, e.g., an inductor at high frequency, e.g., 360 Hz. Accordingly, the rising edge of the output waveform is sloped, generally analogous to the rising edge of a true sine wave, as opposed to the abrupt rising edge of a square wave.

Referring again to FIGS. 4A and 4B, compressor 142 may comprise any apparatus, (such as, e.g., a pump, screw, scroll or vane compressor) capable of being driven by engine 102, that compresses atmospheric air to a higher pressure and discharges it through transfer tube 144 into reservoir 146. Compressor 142 suitably comprises a belt driven, oil lubricated reciprocating piston pump capable of operation at from 2 to 11 (preferably 10 or 11) CFM at 90 PSI (or in the case of the two-stage compressor from 10 to 20 (preferably 20) CFM at 175 PSI).

Drive system 140 may comprise any mechanism capable of transmitting motive force from engine 102 to compressor 142 for selectively supplying pressurized air to reservoir 146.

As previously noted, in the preferred embodiment, drive system 140 comprises a sheave 166, a connecting link 168 (e.g., belt), a flywheel 170, and a vent (blow off) valve 151. More specifically, engine 102 includes, as noted above, an output shaft 126. Sheave 166 is disposed for rotation with shaft 126. Shaft 126 suitably extends through rotor 138 (rotor 138 is suitably directly coupled for rotation with shaft 126) and is connected to sheave 166. Alternatively, sheave 166 can be coupled to rotor 138, particularly when an external rotor is employed. Connecting link 168, suitably a V-belt, pulley belt, or chain, transmits the rotation of sheave 166 to flywheel 170. Flywheel 170 provides the drive for the compressor 142, and as well as a significant mass to smooth out the pulsating load of compressor 142 and variations in the performance of engine 102. Flywheel 170 also suitably includes an integral fan 172 for cooling compressor 142. In general, the operation of alternator 104 preferably entails relatively high engine RPM, e.g., in excess of 3600 RPM. On the other hand, compressor 142 typically requires a lower RPM. Accordingly, drive system 140 suitably provides for a predetermined ratio, e.g., reduction, between pulley 166 and flywheel 170.

Drive system 140 also provides a mechanism for controlling application of pressurized air to reservoir 146 to facilitate continued operation of engine 102 without continued pressurized air flow into reservoir 146 with reservoir 146 already at a maximum pressure. In the preferred embodiment, vent valve 151 is selectively actuated by control circuit 109 (e.g., by controller 110 in accordance with the pressure in reservoir 146) to effectively divert the pressurized air flow into the atmosphere. Compressor 142 thus remains operatively connected to engine 102, but no longer provides pressurized air flow to reservoir 146. Alternatively, a clutch may be provided on either pulley 166 or flywheel 170 to provide selective freewheeling or a belt-tensioning device may be provided to selectively decouple or disengage belt 168 from pulley 166, in each case under the auspices of control circuit 109 based on air demand.

Figure 17:
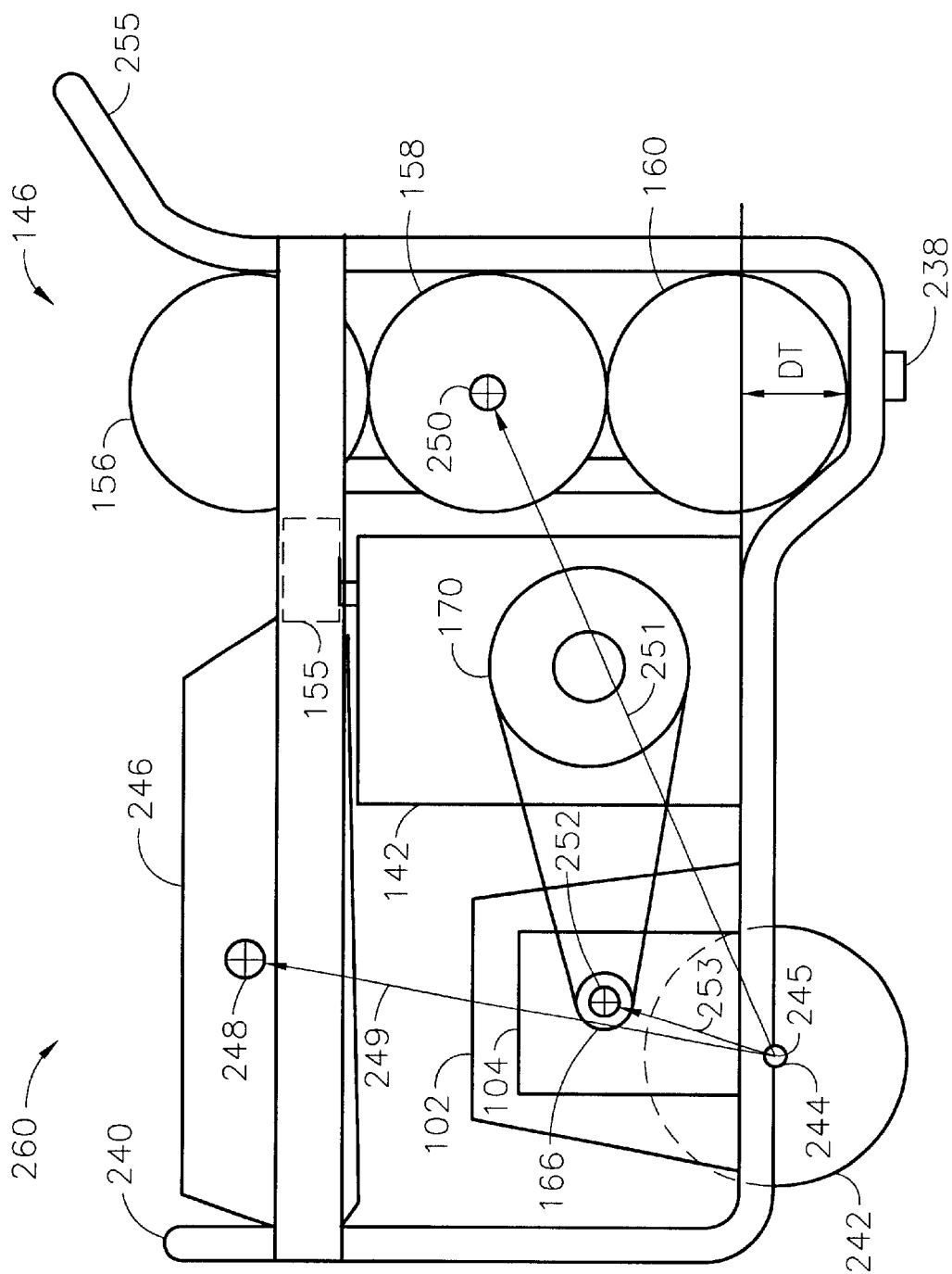
FIG. 17 is a left side plan view of a first portable system according to various aspects of the present invention.
Figure 18:
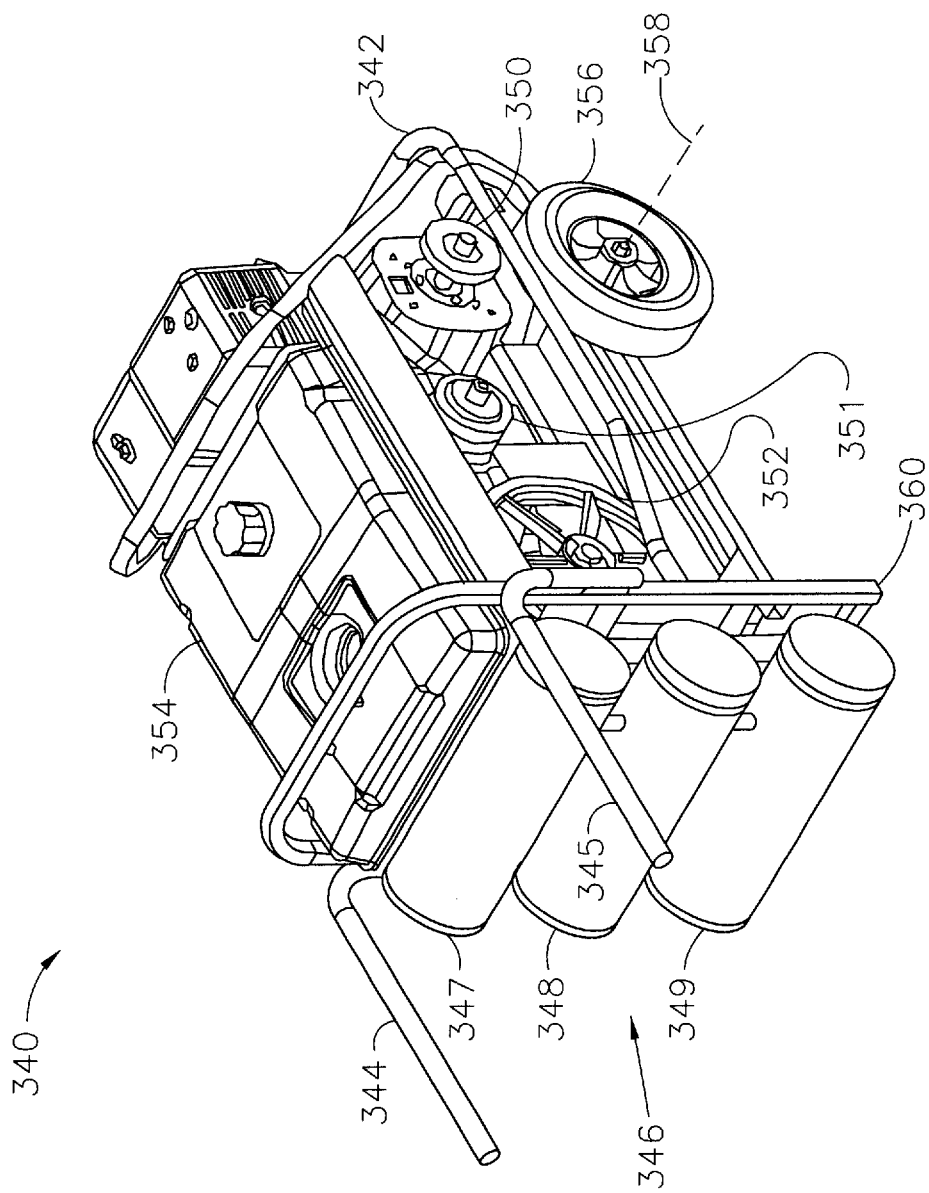
FIG. 18 is a perspective plan view of a second portable system according to various aspects of the present invention.

Referring to FIG. 17, system 100 suitably includes a frame 240, including wheels 242. Engine 102 (and an associated fuel tank 246), the heaviest elements of the system, are suitably disposed vertically over wheels 242. Reservoir 146 provides a supply of pressure regulated air to output line 152 and output valve 153 located on a horizontal top panel. As previously noted, in the preferred embodiment, reservoir system 146 comprises a check valve 154, a predetermined number (e.g., 3) of tanks 156, 158, and 160, a pressure regulator 162, and a drain 164. Tanks 156, 158, and 160 are preferably disposed in a vertical stack laterally offset from engine 102 and compressor 142. Lower-most tank 160 is preferably disposed below the level of compressor 142 and engine 102 to provide additional stability.

The pressurized air from transfer conduit 144 may be admitted through check valve 154 into any tank of reservoir 146. Preferably, air is admitted into tank 156 and passes in sequence through tanks 158 and 160 to cool prior to being supplied through output line 152. Regulator 162 is preferably disposed at least one tank upstream of output line 152, e.g., between tanks 158 and 160. Fluid communication between the tanks upstream of the regulator is provided. Drain 164 is provided in the lower-most tank. Employing a laterally offset vertical stack of smaller (e.g., two gallon)

tanks, rather than horizontally disposed larger (four gallon) tanks (e.g., underlying engine and compressor), permits advantageous weight distribution of the components of system 100. Engine 102, alternator 104, and compressor 142 can be disposed relatively close to the ground such that the unit has a low center of gravity. The particular arrangement and relative disposition of elements shown in FIG. 17 is particularly advantageous in that it is compact and provides a particularly low center of gravity for stability (e.g., from tipping when transported in the bed of a truck).

Controlling engine speed in accordance with air demand makes a narrower range of acceptable reservoir pressure and a smaller reservoir capacity feasible without creating a condition called short cycling.

As previously noted, the regulator in conventional compressed air systems is typically disposed downstream of the storage tank, interposed between the tank and output line. The reserve capacity of regulated air is, therefore, limited to air in the output line. Accordingly, if a user depletes the volume of regulated air in the output line (e.g., through rapid uses of a tool such as a nail gun), there is no additional reserve capacity and inefficiencies in the regulator are reflected as a pressure drop at the output valve. In effect, the reserve of regulated air is exhausted, and the regulator does not pass sufficient air to meet the user's needs. By employing plural tanks, and disposing the regulator upstream of one or more of those tanks, the reserve capacity of regulated air is increased.

Control circuit 109 derives or receives feedback signals indicative of system operation, and generates control signals to the system components. As will be explained, in the preferred embodiment: floating voltage feedback circuit 118 provides a signal (Vfb) indicative of engine (alternator) speed (and AC output current); short circuit detector 120 provides a signal to controller 110 indicative of a short circuit condition; and low voltage regulation/disable circuit 124 generates a control signal LVD indicative of low voltage conditions. A feedback signal TP indicative of the pressure in reservoir 146 is also provided by transducer 150. Controller 110, receives the feedback signals and generates control signals to converter circuit 105, throttle control 112 (in cooperation with driver circuit 113), and vent valve 151.

More specifically, floating voltage feedback circuit 118 provides an unregulated signal (Vfb) indicative of engine (alternator) speed and an accurate indication of current drawn from winding W1(AC load). Floating voltage feedback signal Vfb is applied as a control signal to controller 110. As previously noted, current drawn by the AC load at terminals L1 and L2 is one of the parameters employed to control engine speed. The output RL of regulator 106 is generally indicative of engine speed. However, rail signal RL is subject to regulation, e.g., the firing angles of the SCRs are controlled to provide an appropriate output level. Accordingly, under certain circumstances (e.g., when the SCRs are less than "full on"), rail voltage does not accurately reflect engine speed. Without the regulation, the speed would generate a higher voltage. Floating voltage feedback signal Vfb is applied as a control signal to controller 110, and provides the primary control parameter with respect to the AC output.

Figure 8:
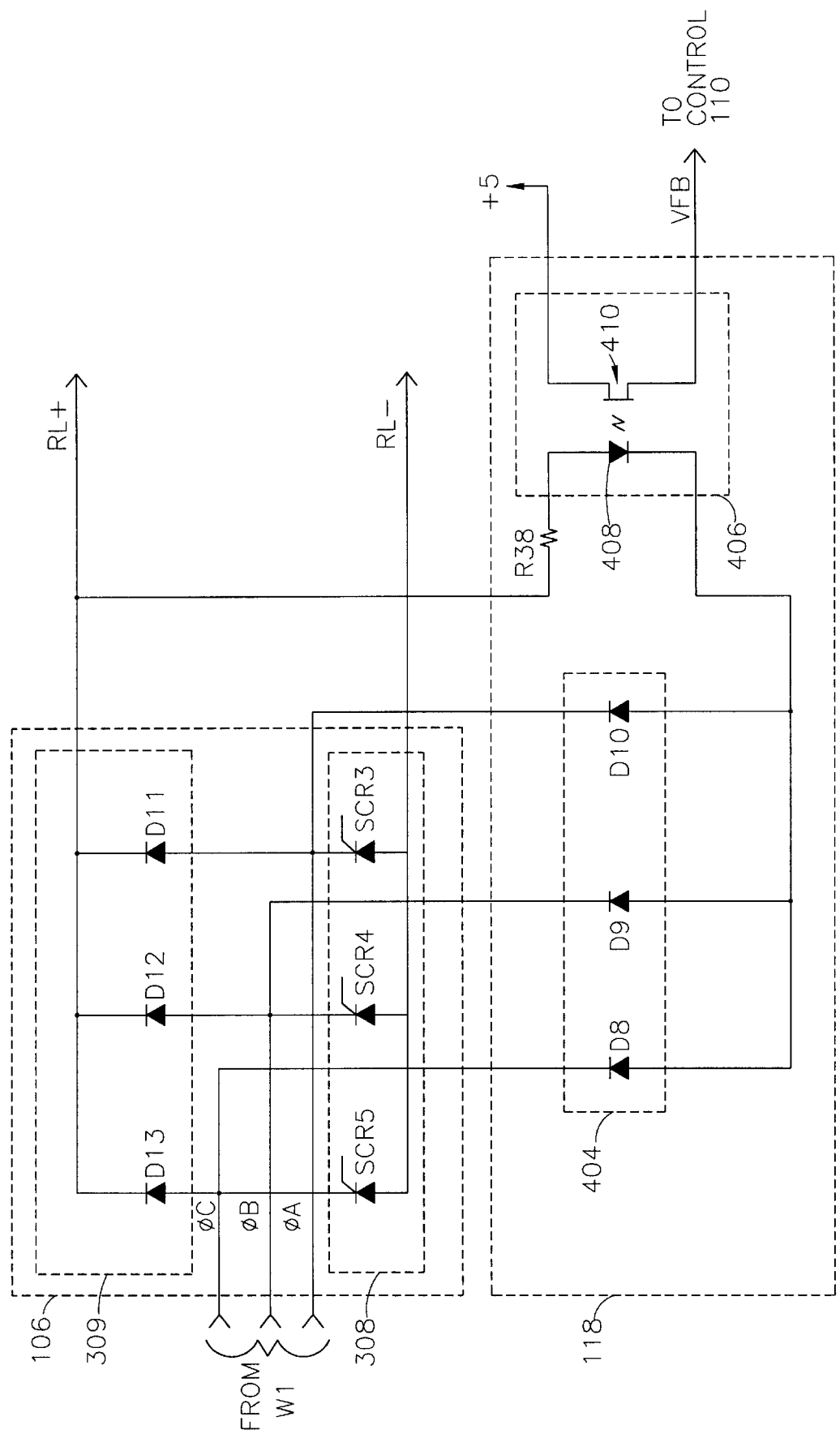
FIG. 8 is an electrical schematic diagram of a floating voltage feedback circuit for use in the system of FIGS. 4A and 4B.

Referring to FIG. 8, floating voltage feedback circuit suitably comprises a diode bridge rectifier, and a conventional analog opto-isolator 406. The diode bridge is suitably formed by a set of three diodes 404 (one for each phase) cooperating with diodes D11, D12, D13 of rectifier 106. The cathodes of diodes 404 are connected to the respective phases of winding W1 (and the anodes of the corresponding rectifier diodes). Opto-isolator 406 is suitably a FET optocoupler including an LED 408 and an output FET 410, such as a QT Optoelectronics H11-F3. Opto-isolator LED 408 is connected, in series combination with a suitable resistor R38, between rail RL and the anodes of diodes 404 (i.e., across the rectifier bridge formed by diodes 309 and 404) and generates optical indicia of the amplitude of the rectifier output. Opto-isolator FET 410 generates an output signal Vfb indicative of the unregulated rail voltage (thus, actual engine speed) but in an amplitude range compatible with an analog to digital converter in controller 110. In the absence of load from compressor 142, for any given throttle setting, the speed of engine 102 depends upon the load on inverter 108. The electrical load on inverter 108 is reflected as a mechanical (magnetic) resistance to rotation of rotor 138 and engine shaft 126. Engine speed is, therefore, indicative of load demand. As will be hereinafter discussed, feedback signal Vfb is applied to an analog to digital converter in controller 110.

Controller 110 generates control signals to a driver circuit 113 to effect throttle control in accordance with feedback signal Vfb and the output of transducer 150. Consequently, subject to the maximum engine speed established by RPM limiter 116 and the maximum rail voltage established by the regulation of rectifier 106, engine speed may be adjusted in accordance with electrical load demand and reservoir pressure.

Control of engine speed in accordance with either the DC output level or reservoir pressure is particularly economical. For example, the throttle setting is increased by one unit if the DC output level is below a predetermined threshold and decreased by one unit if the DC output level is above the predetermined threshold. Likewise, the throttle setting is increased by one unit if the reservoir pressure is below a predetermined lower threshold and decreased by one unit if the reservoir pressure is above a predetermined upper threshold. Controls may be suitably limited in extent and timing. In some instances, such as when an attempt is made to increase reservoir pressure, runaway may occur. Allowances may be made for engine 102 response time to changes in throttle setting. It can also be important to limit transient surges in the DC output level. For example, control circuit may be particularly susceptible to transient surges and high voltages.

In the preferred embodiment, a safeguard is provided by limiting engine speed through spark attenuation if the output level of control winding WC exceeds a predetermined threshold. This is advantageously employed to simplify control of the system by, in effect, governing the maximum compressor speed, limiting transients on the inverter bus (RL), and facilitating load demand throttle control by compensating for the limited response time of the throttle control. Referring now to FIGS. 9–10, ignition controller 116 suitably comprises: a rectifier 620 (diode bridge and filter capacitor C25) for generating a DC signal corresponding to the output of winding WC (proportional to engine speed), a suitable triggering circuit 622, and a switching device (e.g., MOSFET Q20) disposed to selectively ground primary winding 608 of magneto 130.

Triggering circuit 622 generates a biasing signal to selectively render MOSFET Q20 conductive. Triggering circuit 622 suitably comprises a Zener diode D28 and a gate protection circuit comprising a Zener diode D30 and a resistor R2. The cathode of Zener diode D28 is connected to the rectifier 620 and the anode is connected to the gate of MOSFET Q20. The break-over voltage of Zener diode D28 corresponds to the voltage induced in control winding WC at the maximum desired engine speed. When Zener diode D28 is rendered conductive (i.e., its break-over voltage is exceeded by the voltage generated by rectifier 620) current is applied to the gate of MOSFET Q20. When MOSFET Q20 is rendered conductive winding 608 is grounded. MOSFET Q20 remains conductive so long as the voltage generated by rectifier 620 exceeds the Zener break-over voltage (i.e., engine speed exceeds a predetermined value).

Grounding magneto primary winding 608 has the effect of attenuating (reducing the amplitude of) the voltage induced in magneto secondary winding 610 by the magnetic interaction of secondary winding 610, magneto fly wheel 602, and primary winding 608. The attenuated spark prevents engine 102 from operating at full efficiency. Complete combustion of the fuel does not occur. Incomplete combustion limits efficiency and power and consequently limits RPM.

Figure 11:
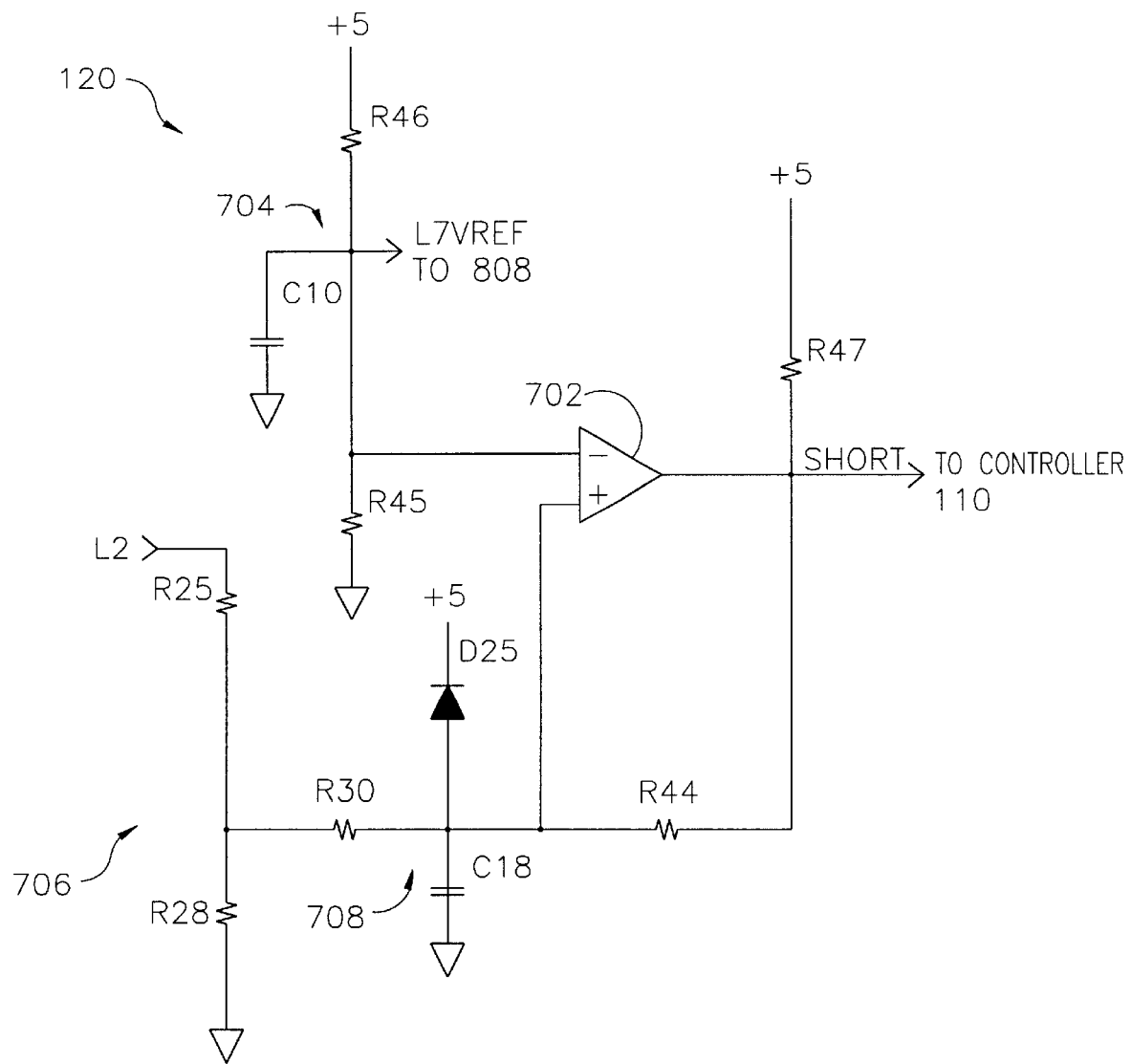
FIG. 11 is an electrical schematic diagram of a short circuit detection circuit for use in the system of FIGS. 4A and 4B.

Short circuit detector 120 monitors output current and provides a signal to controller 110. In response to detection of a short circuit, controller 110 effectively disables inverter 108. More specifically, short circuit detection circuit 120 preferably compares the voltage at one of the AC output terminals with a predetermined threshold value. The threshold value suitably corresponds to a relatively high current, e.g., in the range of 60 or 70 amps. If the voltage at the terminal exceeds the threshold value during a portion of the AC cycle when the low side switch associated with that terminal would normally be conductive, a short circuit across terminals L1 and L2 is indicated. For example, if the voltage at terminal L2 (i.e., the source-drain voltage across bottom right switch Q9/Q10) exceeds a certain level during a portion of the AC cycle when that switch is conductive, a short is indicated. Referring now to FIG. 11, short circuit detection circuit 120 suitably comprises a comparator 702, a reference voltage generator 704 (R46, C10, R45), a voltage divider 706 (R25, R28), and a clipping filter 708 (R30, C18, D25). Reference voltage generator 704 provides a reference voltage (e.g., 1.7 volts) to the negative input of comparator 702. Voltage 706 divides down the voltage at terminal L2 by a predetermined ratio (e.g., one half). Filter 708 filters the divided down voltage, and clips its amplitude to a predetermined maximum acceptable level (e.g., 5 volts). The output of a filter 708, indicative of the voltage at terminal L2, is applied to the positive input of comparator 702. Under normal operating conditions, the voltage applied to the positive input of comparator 702 is less than the reference voltage during the relevant portion of the AC cycle. Accordingly, the output (SHORT) of comparator 702 is normally low during the relevant time period. On the other hand, if the short circuit causes an abnormally high source-drain voltage across bottom right switch Q9/Q10, the voltage applied to the positive terminal of comparator 702 exceeds the reference voltage and the output (SHORT) of comparator 702 goes high. As will be discussed, controller 110 selectively monitors the output (SHORT) of comparator 702 and effectively disables inverter 108 if a high level signal is detected during the relevant time period.

Operation of various components of system 100 (for example, the MOSFET power witches of H bridge 111) with supply voltages below a predetermined minimum, is potentially damaging to those components. Accordingly, it is desirable that operation be inhibited until the supply voltages reach a predetermined level. Since the supply voltages are generated by interaction of the rotor with control winding Wc, supply voltages below the safe level are of concern at particularly low engine speeds. Accordingly, low voltage regulation/disable circuit 124 not only cooperates with control winding Wc to generate various regulated supply voltages to the electronic components system 100, but also generates a control signal LVD to controller 110 indicative of low voltage conditions, e.g., when engine speed is too low to generate the voltages necessary to power the electronic components. Controller 110, in effect, inhibits the operation of the system until an operating condition that is safe for the various components of the system is attained.

Figure 12:
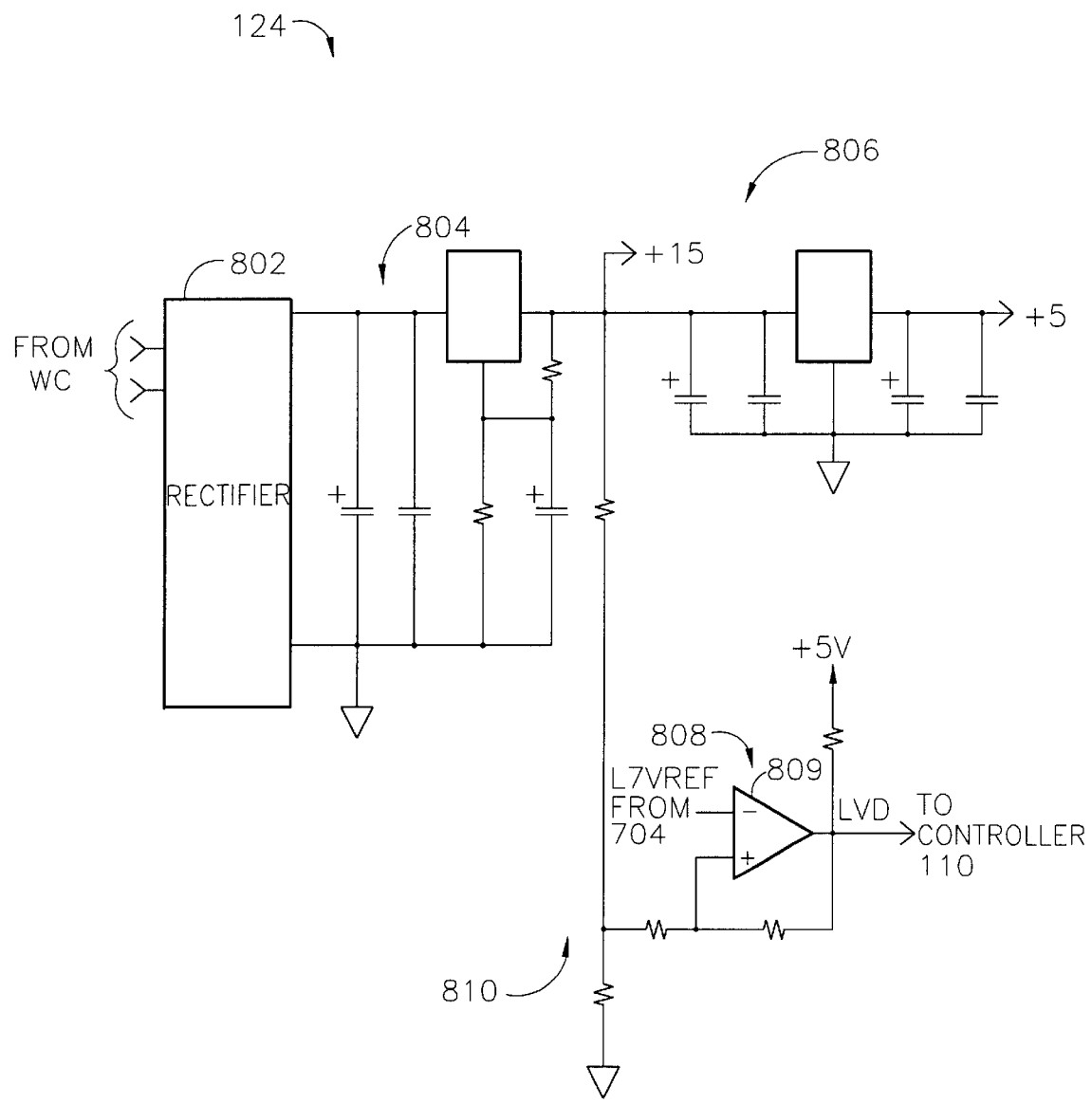
FIG. 12 is an electrical schematic diagram of a low voltage disable/regulation circuit for use in the system of FIGS. 4A and 4B.
Figure 13:
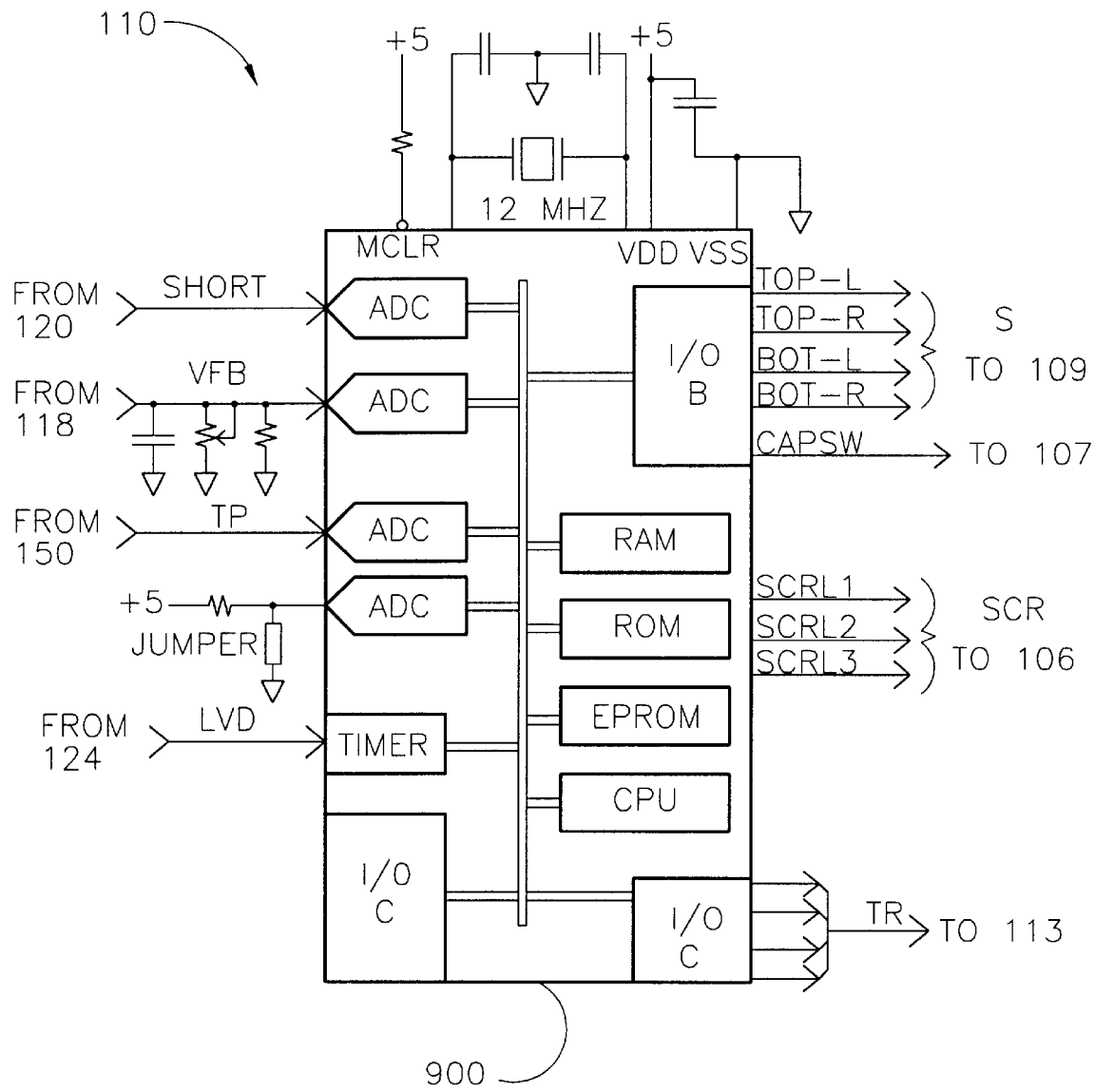
FIG. 13 is a functional block diagram of a controller suitable for use in the system of FIGS. 4A and 4B.
Figure 14:
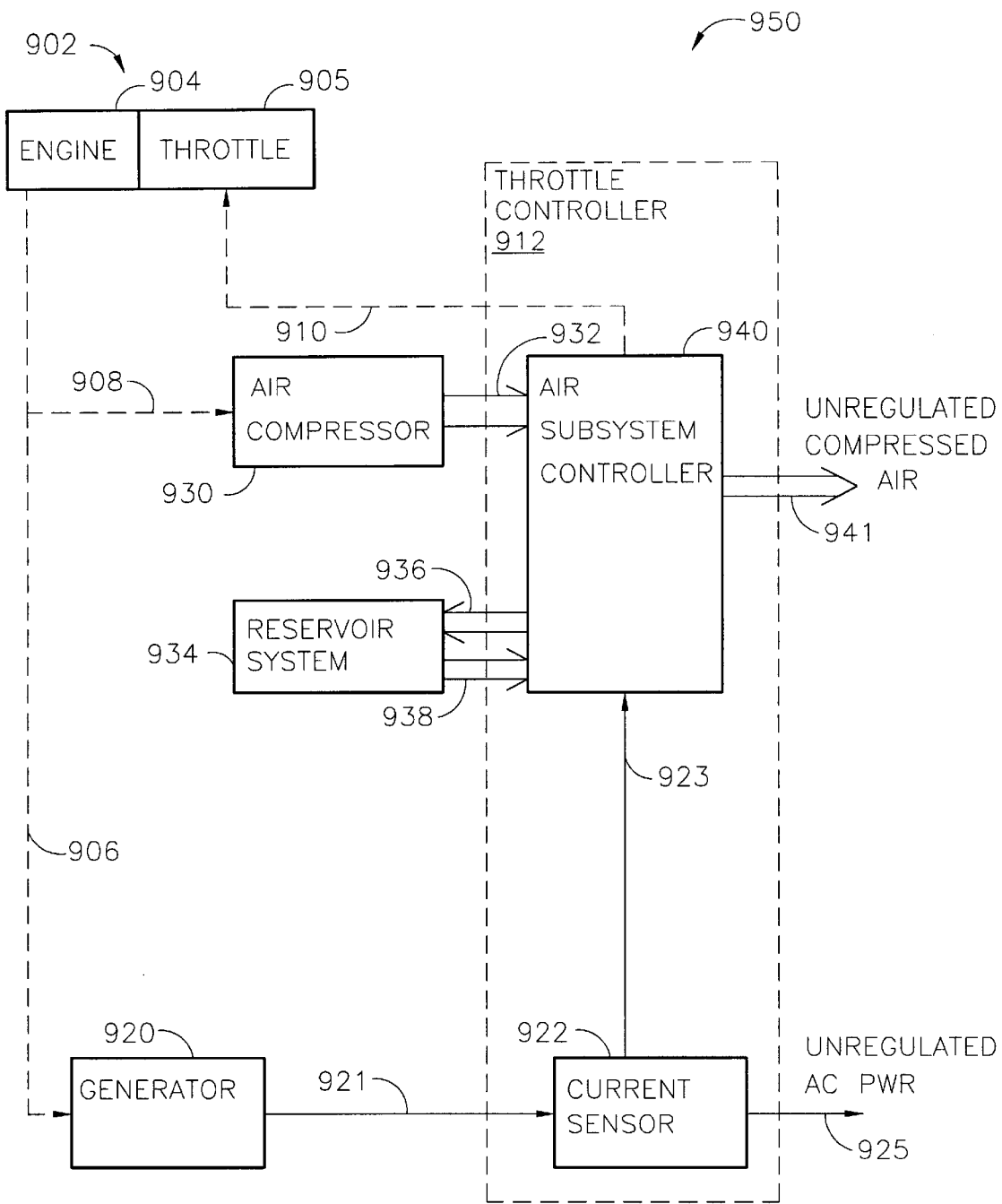
FIG. 14 is a functional block diagram of another system for providing electrical power and compressed air according to various aspects of the present invention.
Figure 15A:
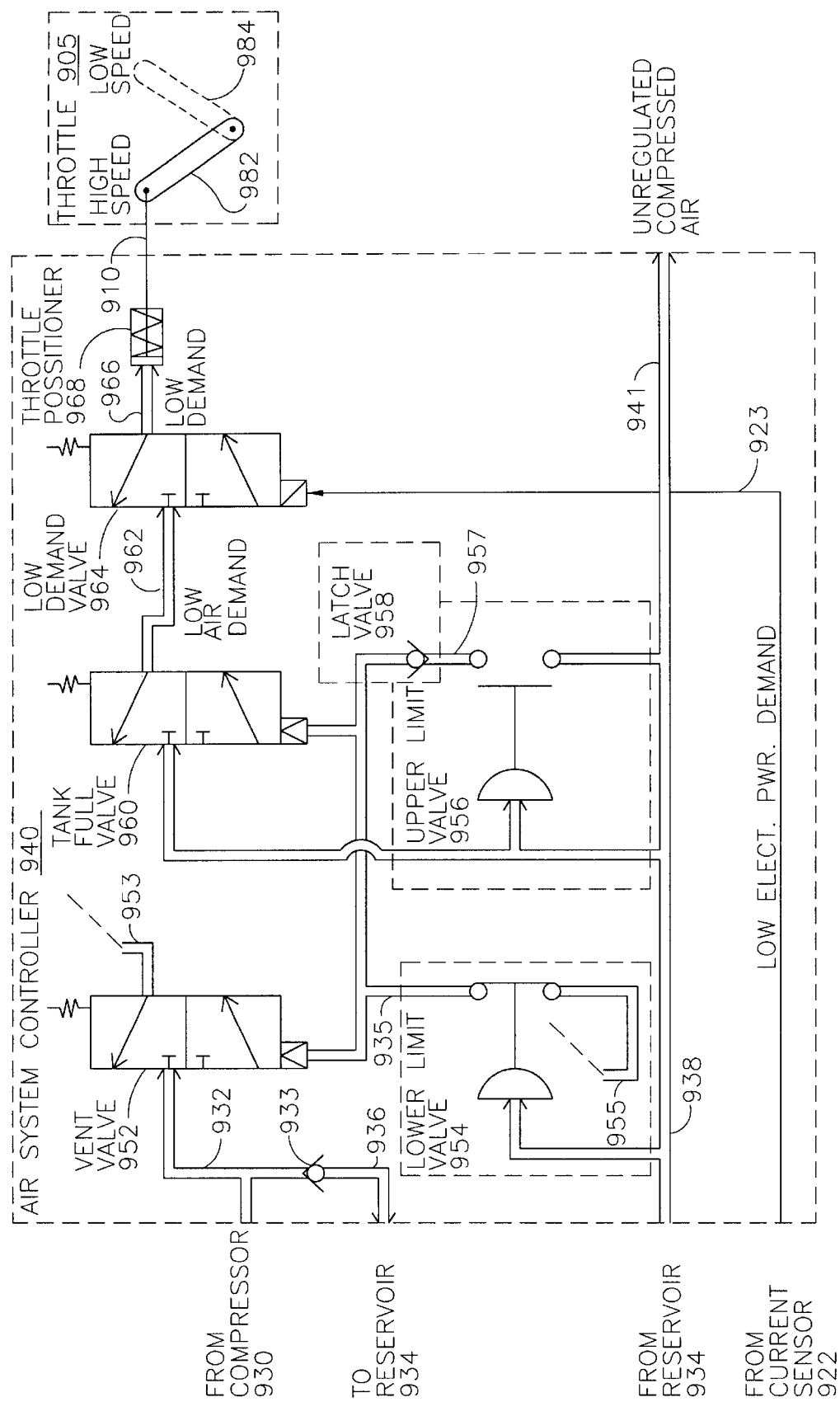
FIGS. 15A and 15B are pneumatic schematic diagrams of alternate air subsystem controllers for use in the system of FIG. 14.
Figure 15B:
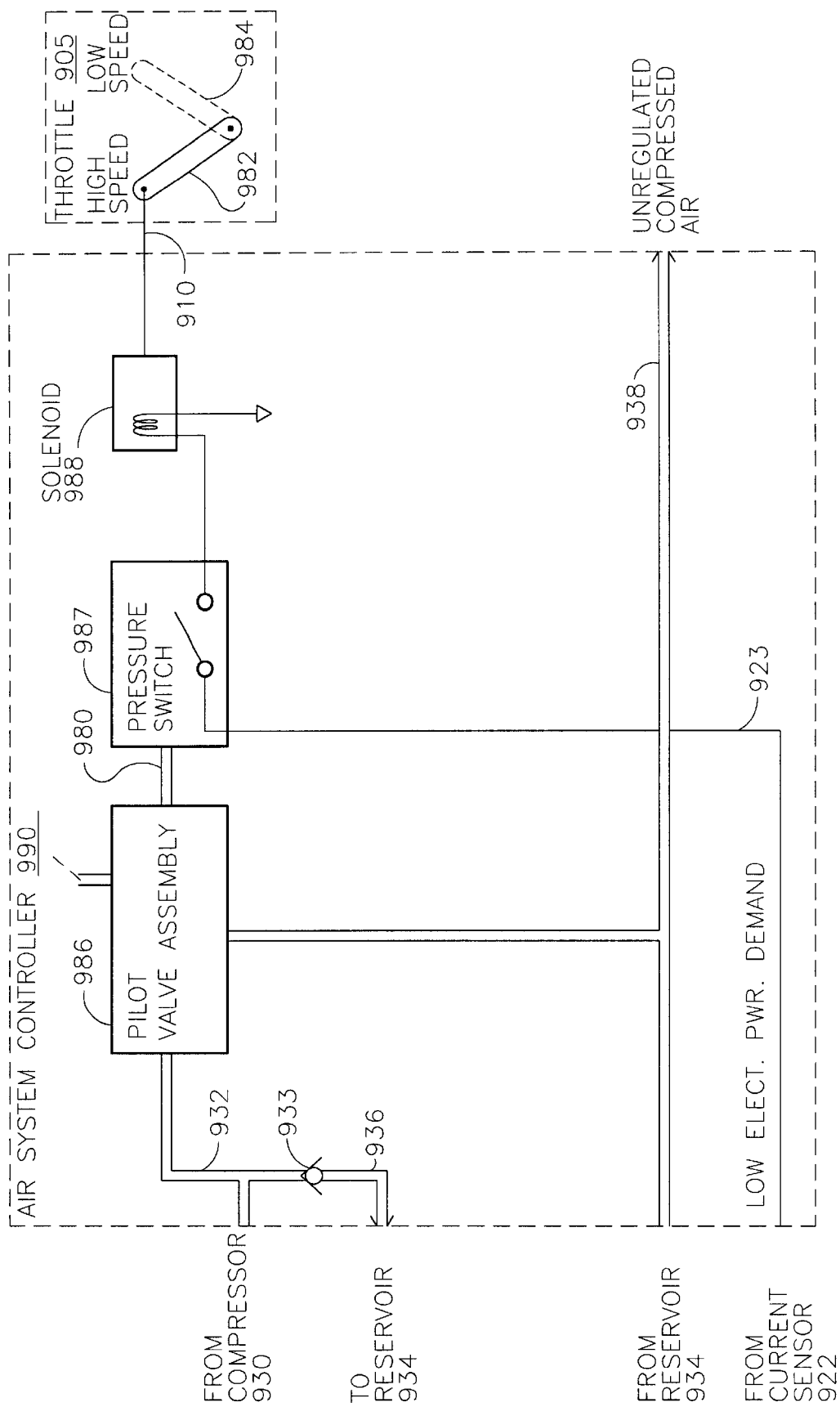
Figure 16:
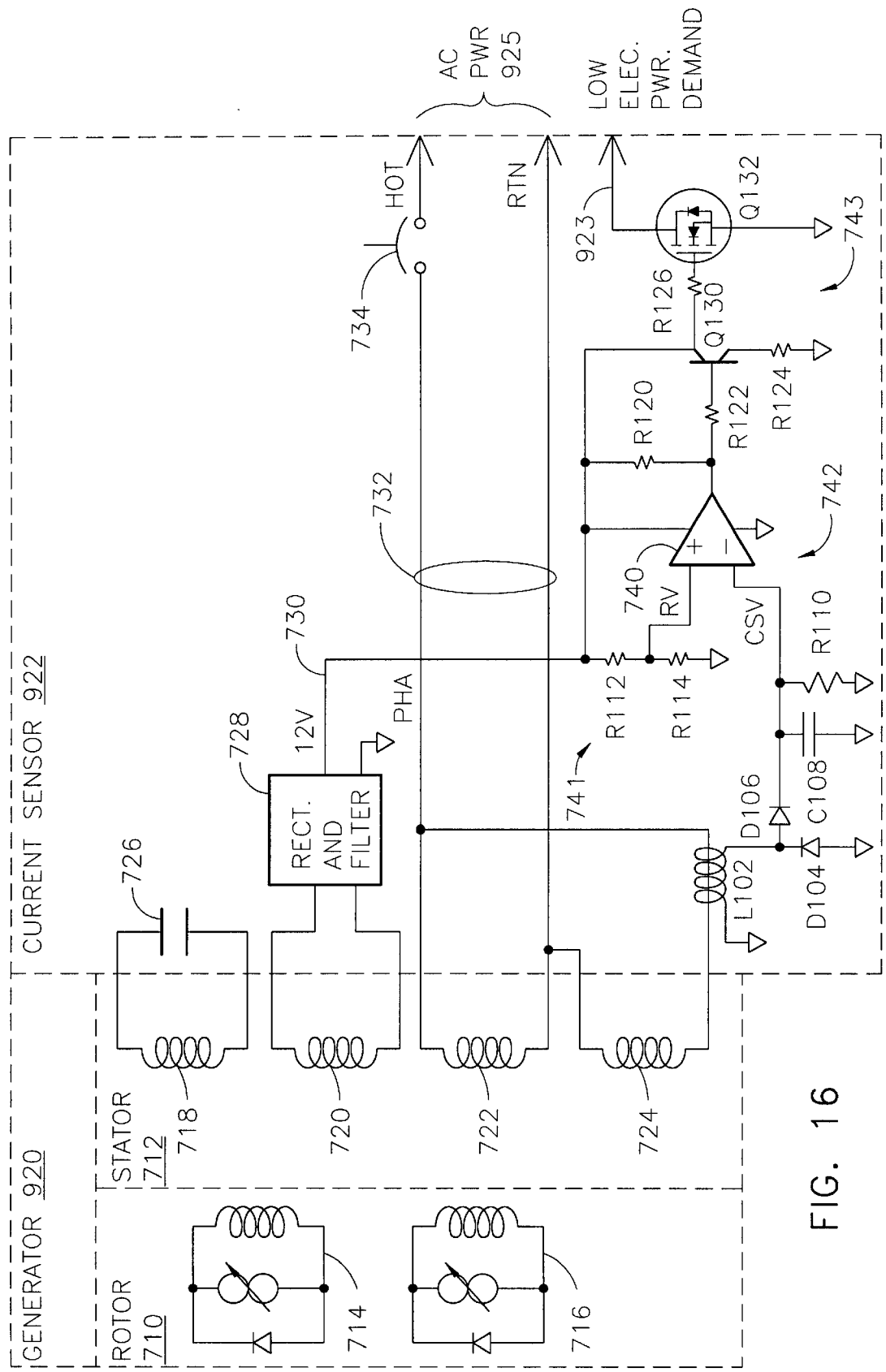
FIG. 16 is an electrical schematic diagram of a generator and current sensor for use in the system of FIG. 14.

Low voltage regulation/disable circuit 124 cooperates with control winding Wc to generate various DC signals to provide power to the electronic components of system 100, as well as control signal LVD. Control signal LVD is indicative of low voltage conditions, for example, when engine speed is too low to generate the voltages necessary to power the electronic components. Referring now to FIG. 12, low voltage circuit 124 suitably comprises: a conventional commercial rectifier 802 cooperating with control winding Wc; respective conventional voltage regulators 804 and 806 for generating first and second regulated supply voltages (e.g., 15 volts and 5 volts); and a comparator circuit 808. Comparator circuit 808 compares a signal indicative of the regulated 15 volts supply voltage to a predetermined level (e.g., 1.7 volts, suitably generated by reference voltage generator 704 in short circuit detector 120). More specifically, a voltage divider 810 divides down the regulated supply of voltage by an appropriate ratio (e.g., by a factor of 7.7). The voltage indicative of the supply voltage is applied to the non-inverting input of a comparator 809. The reference voltage (e.g., 1.7 volts), indicative of a minimum acceptable supply voltage, is applied to the inverting input of comparator 809. Under acceptable operating conditions, the voltage applied to the non-inverting input is greater than the reference voltage.

Accordingly, under acceptable conditions the output LVD of comparator 809 is high. If, however, the supply voltage is too low, the voltage applied to the non-inverting input is less than the reference voltage and the output of comparator 809 goes low. Controller 110 monitors the output LVD of comparator 809 and effectively disables the relevant portions of the circuit during periods when LVD is low.

Driver circuit 113 may comprise any circuit capable of providing drive signals suitable for throttle control 112 in response to control signals from controller 110. Suitable driver circuits are described in U.S. Pat. No. 5,886,404 (issued Mar. 23, 1999). For example, where a stepper motor is employed in throttle control 112, driver circuit 113 selectively effects current paths through the coils in response to the control signals from controller 110. Selective actuation is effected, e.g., by varying a count employed to generate the control signals. The stepper motor may be operated either in a single activate winding (low power) mode or in paired winding (high torque) mode.

In general, the number of poles establishes the resolution of the stepper motor. A typical stepper motor may include 48 poles. The resolution of the stepper motor can, however, be improved by a factor of two, i.e., equal to 360° divided by twice the number of poles (e.g., 360/2(48)=3.75°) by variously energizing a single winding to bring the stepper rotor into alignment with the stepper stator pole, then energizing a pair of windings to bring the rotor into alignment with the midpoint between that stator pole and the next.

The effective resolution (i.e., number of steps) from the perspective of the controlled engine, can also be multiplied by dithering (switching back and forth between successive coil actuation states in the rotation sequence) at a rate faster than the mechanical response time of the rotor (as coupled into the overall system) but less than the inductive rise time of the stepper winding; the engine reacts as if the throttle was at a setting equal to the average setting over the response period of the engine. If the dithering frequency (i.e., the rate at which differing activation control signals are applied) exceeds the inductive rise time of stepper windings, the motor, unable to react to the activation currents, loses torque. On the other hand, if the switching frequency is less than the inductive rise time of the stepper winding, but exceeds the response time of the engine (e.g., between 10 microseconds in smaller engines, and 0.25 to 0.5 seconds in larger engines) the effective throttle setting as perceived by the engine is the position corresponding to the average of the activation states over the period. More specifically, if the frequency is less than the time constant of the system linkage (rotor as connected in the system), but exceeds the response time of the engine, the throttle tends to move between positions corresponding to the respective actuation states at the dithering frequency. However, the engine is unable to respond to the throttle movement, and perceives the throttle as being in the average position.

The same averaging effect can, however, be attained without physical oscillation of the throttle. If the switching frequency exceeds the time constant of the system linkage, i.e., the rotor as connected in the system, mechanical momentum effectively moves the throttle into an intermediate position, corresponding to the time average of the actuation states. The linkage is unable to respond to the actuation states before they change, and accordingly, the throttle is retained in the intermediate position. In general, it is desirable to use a switching frequency that only minimally exceeds the time constant of the system linkage (e.g., the lowest frequency that permits the throttle to assume a static position) to avoid wear on the throttle plate and pivot mechanism.

Controller 110 may be any device capable of providing suitable control signals to the various components of system 100. Controller 110 suitably comprises a micro-computer based unit which receives one or more feedback signals from the system components, (e.g., Vfb from floating voltage feedback circuit 118, LVD from low voltage detector 124, SHORT from short circuit detector 120, and TP from transducer 150) and accordingly generates control signals to rectifier 106 (SCRL), inverter 108(s), and throttle control driver 113 (TR). Suitable controllers are described in U.S. Pat. No. 5,625,276 (issued Apr. 29, 1997) and co-pending application Ser. No. 08/752,230 (filed Nov. 19, 1996). More specifically, referring to FIG. 9, controller 110 preferably comprises a microcomputer 900, for example, a Microchip type PIC 16C72 microcontroller which incorporates an internal read only memory (e.g., an electronically programmable memory or EPROM), a random access memory (RAM), an analog-to-digital (A/D) converter, and both analog and digital input/output (I/O) facilities. Microcomputer 900 suitably receives (in addition to clock and power signals) respective input signals from the system components: TP from transducer 150, a signal indicative of reservoir pressure; Vfb from floating voltage feedback circuit 118, an analog signal indicative of engine RPM/AC load (Pin 3); LVD from low voltage detector 124, a digital signal indicative of whether the DC supply voltage to the system components is (logic high) or is not (logic low) above a selected minimum value (Pin 6); and SHORT from short circuit detector 120, a digital signal indicative of whether the voltage is (logic high) or is not (logic low) above a selected threshold value indicative of a potential short circuit condition (Pin 7).

Microcomputer 900 also suitably generates respective output signals to the system components such as inverter 108 and throttle control driver 113. The signals provided to inverter 108 in FIGS. 4A, 6 and 7 include: CAPSW (Pin 25) to selectively connect and disconnect switched capacitance 320 into the operative circuit; and Top-r (Pin 24), Top-l (Pin 23), Bot-r (Pin 22), Bot-l (Pin 21) to control SCRs generally indicated as S. The signals provided to rectifier 106 (generally indicated as SCR in FIG. 4A) and throttle control driver 113 (generally indicated as TR in FIG. 4A) are provided at Pins 28–26 and 15–18, respectively.

Microcomputer 900 controls the operation of system 100 by executing a predetermined sequence of steps to: generate the control signals to effect operation of the inverter 108; test the state of various input signals such as LVD, MODE, and SHORT and, accordingly, execute predetermined protection routines if called for; and test the state of Vfb, and TP, and accordingly execute appropriate routines to generate control signals to driver circuit 113 to control engine speed. Microcomputer 900 also institutes specified process sequences in response to and/or upon the occurrence of predetermined conditions or interrupts. Any suitable program for effecting such operations may be employed.

Particular advantages may be realized in an implementation of system 10 adapted, among other purposes, for low cost and ease of transportation. A reduced set of relatively light weight and relatively powerful components may be arranged as described below with reference to system 950 of FIGS. 14–20. System 950, in accordance with various aspects of the present invention, suitably comprises: an engine assembly 904 comprising an engine 904 and throttle 905; a generator 920; a throttle controller 912; an air compressor 930; and a reservoir system 934.

Engine assembly 902 may be of the type described above with reference to engine assembly 11. Engine 904 may include an ignition of any conventional type. Control of the ignition as discussed above has been eliminated. Engine 904 is directly coupled to both generator 920 via drive train 906 and to air compressor 930 via drive train 908. Either or both drive trains 906 and 908 may be implemented as discussed above (e.g., extended shaft, sheave integral with rotor, separate sheave and fly wheel, etc.).

Generator 920, air compressor 930, and reservoir system 934 are of the types described above with reference to generator 36, alternator 104, compressor 21, compressor 142, reservoir system 26, and reservoir system 146. Generator 920 may include a single phase or a multiphase power winding; though the separate control winding as discussed above is eliminated. Control functions performed by electrical subsystem controller 34 and by control circuit 109 have been reduced or eliminated in system 950, except to the extent described below. For example, throttle control and maintaining a suitable pressure in reservoir system 934 is advantageously accomplished by throttle controller 912.

Elimination of various systems found in systems 10 and 100 from system 950 has been accomplished to reduce initial purchase cost, reduce maintenance and other costs of ownership, to reduce complexity, and to improve reliability. Of course the selection, range, and accuracy of outputs of system 950 as well as some automatic features of operation have been sacrificed to some extent.

Throttle control for system 950 accomplishes priority provision of electrical power and secondary provision of compressed air by operating throttle 905 in response to monitoring a magnitude of electrical power being provided and monitoring air pressure in the reservoir system. For example, throttle controller 912 includes air subsystem controller 940 and current sensor circuit 922. Current sensor circuit 922 monitors current provided by a winding of generator 920 via line 921. When less than a threshold current is being provided, current sensor circuit 922 provides a signal to air subsystem controller 940.

An air subsystem controller in system 950 (a) maintains a suitable pressure in reservoir 934 by operation of a vent valve, and (b) operates throttle 905 to provide throttle control functions as discussed above. For example, air subsystem controller 940 monitors reservoir pressure for the occurrence of a relatively low demand for compressed air and monitors an electrical signal from current sensor 922 for occurrence of a relatively low demand for electrical power.

Throttle 905, when engine 904 is started, is maintained by throttle controller 912 at the first of two positions corresponding to a relatively high engine RPM and a relatively low engine RPM. High engine speed is reduced by operating throttle 905 via link 910 in the event that a relatively low demand for electrical power coincides in time with a relatively low demand for compressed air. When either a demand for electrical power or a demand for compressed air negates the relatively low demand condition, throttle controller 912 again operates throttle 905 to restore high engine speed operation.

Air subsystem controller 940 may provide compressed air on line 941 and cooperate with air compressor 930 and reservoir system 934 as discussed above with reference to air subsystem controller 23. Controller 940 receives compressed air from air compressor 930 via line 932 and supplies the same to reservoir system 934 via line 936. Air for line 941 is provided from reservoir system 934 via line 938 through controller 940. Pressure in reservoir 934 is maintained between a lower limit and an upper limit. When too low, controller 940 determines that a demand for compressed air exists. When too high, controller 940 operates the vent valve. For example, air subsystem controller 940 of FIG. 15A includes vent valve 952, tank full valve 960, low demand valve 964, throttle positioner 968, lower limit valve 954, upper limit valve 956, and latch valve 958. Conventional valves and cylinder may be used. Valves 952, 960, and 964 are three-way spool valves with spring retension in a normal (nonactuated) position (as shown). Limit valves 954 and 956 may be diaphragm valves for a normally closed (954) and normally open (956) position.

Check valve 933, in series between lines 932 and 934, supplies air to reservoir 934 when a pressure difference across lines 932 and 934 exceeds a threshold. Lower limit valve 954 normally vents line 935 to atmosphere through vent 955, but opens that path when the pressure in line 938 from reservoir 934 exceeds the lower limit threshold. Upper limit valve 956 is open until the pressure in line 938 from reservoir 934 exceeds the upper limit threshold; then, valve 956 closes to convey air from line 938 to latch valve 958 via line 957. Latch valve 958 is a check valve that opens when the difference in pressure between lines 957 and 935 exceeds a threshold value; then conveys air to charge line 935 to operate both vent valve 952 and tank full valve 960. Consequently, pressure in line 938 from reservoir 934 is maintained between the lower (954) and the upper (956) thresholds. Line 938 is common to line 941 which supplies compressed air to loads connected to system 950. In other words, because air compressor 930 receives effectively continuous rotational drive via drive train 908, throttle 905 will be maintained at the high speed position when reservoir pressure is low and the reservoir will be filled and/or air loads supplied via line 941.

Vent valve 952 operates on pressure from line 935. In a normal position, air from compressor 930 in line 932 is blocked by the spool. When actuated, air in line 932 passes to vent 953 to atmosphere.

Tank full valve 960 operates on pressure from line 935. In a normal position, air from reservoir 934 in line 938 is blocked by the spool. When actuated, air is line 938 (and 941) passes to line 962 as a low-air-demand signal.

Latch valve 958 holds pressure in line 935 so that when line 935 is initially charged by operation of upper limit valve 956, pressure in line 935 will continue to operate both vent valve 952 and tank full valve 960 until lower limit valve 954 operates to vent line 935 through vent 955.

Low demand valve 964 operates by solenoid when electrical signal low-elect-pwr-demand is received on line 923 from current sensor 922. In a normal position, from tank full valve 960 via line 962 is blocked by the spool. When actuated, i.e., when both signals low-air-demand AND low-elect-pwr-demand are asserted (a logical combination of a pneumatic signal and an electrical signal), low demand valve 964 passes air in line 962 to throttle positioner 968.

Throttle positioner 968 is linked to throttle 905 in any conventional manner, for example, by rigid link 910 to move throttle 905 from a high speed position 982 to a low speed position 984. Throttle positioner 968 includes a conventional pneumatic driven cylinder having a spring for retaining the cylinder in a normal (nonactuated) position. In an alternate implementation a rotary output pneumatic device is used. Consequently throttle 905 is held in high speed position 982 when throttle positioner 968 is not actuated. Air from line 966 actuates throttle positioner 968 to drive its cylinder, link 910, and throttle 905 to the low speed position 984.

The functions of valves 953, 954, 956, 958, and 960 may be provided by an assembly of the type generally referred to as a venting pilot valve, for example, a venting pilot valve model number P25V marketed by Control Devices Inc. of St. Louis, Mo. Preferably such a valve is mounted directly to a tank of reservoir 934 to reduce the length of lines 938 and 941. Line 941 may be formed as part of line 938 or may be provided as a separate outlet of reservoir 934. Any conventional air pressure regulator may be introduced between reservoir system 934 and line 941 to provide (e.g., in addition to unregulated compressed air) regulated compressed air.

An alternate implementation of air subsystem controller provides throttle control responsive to indicia of air pressure and indicia of low electrical power demand. For example, air subsystem controller 990 of FIG. 15B includes pilot valve assembly 986, pressure switch 987, and solenoid 988. Pilot valve 986 is a venting pilot valve as discussed above. In operation, compressed air coupled from compressor 930 by line 932 to pilot valve 986 is vented when pressure in line 938 from reservoir 934 is above an upper limit. Otherwise, the vent is closed and air is allowed to be pumped through check valve 933 to reservoir 934 via line 936. Pressure switch 987 senses pressure in line 980 which may correspond to reservoir pressure when pilot valve 986 is venting line 932. Pressure in line 980 provides indicia of low air demand as discussed above. Pressure switch 987 (when actuated by a low-air-demand condition in line 980) closes an electrical switch to conduct a low-elect-pwr-demand signal on line 923 to actuate solenoid 988. Solenoid 988 when not actuated maintains throttle 905 at position 982 for high speed engine RPM. When actuated, solenoid 988 moves throttle 905 via link 910 to low speed position 984.

Engine RPM is thereby reduced in response to the logical AND combination of indicia of low-air-demand and low-elect-pwr-demand.

The length of line 980 may be reduced in several ways. Preferably, the electrical contacts of pressure switch 980 may be incorporated into the assembly of pilot valve 986 (e.g., to be operated by the same mechanism that responds to pressure for detection of an over upper limit condition). Alternately, these contacts may be responsive to a separate pressure sensing mechanism mounted on or close to pilot valve 986.

A current sensor circuit provides an electrical signal in the event that electric power being supplied by system 950 drops below a threshold. For example, current sensor circuit 922 of FIG. 16 includes excitation capacitor 726, rectifier and filter 728, circuit breaker 734, current sensing coil L102, voltage divider 741, comparator circuit 742, and driver circuit 743. Current sensor circuit 922 cooperates with generator 920 to provide AC power on line 925. Generator 920 includes a rotor 710 having two conventional windings 714 and 716; and a stator 712 having an excitation winding 718, a low power winding 720, and two parallel connected power windings 722 and 724. In an alternate generator, power windings may be multiphase with suitable modifications to current sensor 922 for monitoring current (e.g., in hot or return legs) in one or more phases of such a power winding.

Excitation capacitor 726 completes a resonant circuit with excitation winding 718 for maintaining polarized magnetization in rotor 710 by inducing currents in coils 714 and 716 in a conventional manner for brushless generators.

Rectifier 728 receives AC power from low power winding 720, rectifies and filters the AC to provide a DC power supply signal on line 730 (e.g., 12 volts DC) used for powering electronic circuits 741 and 743 and for establishing a reference voltage.

Windings 722 and 723 provide single phase AC power (signal PHA) on lines 732. Breaker 734 may interrupt current flow that exceeds a trip voltage in a conventional manner. Breaker 734 is in series between signal PHA on line 732 and signal HOT on line 925. Line 732 includes signal RTN that provides a return path to a juncture node common to both windings 722 and 724.

Current sensing coil L102 admits a wire 736 passing along its central axis through the coil. Assembly of current sensor into system 950 is simplified in as much as no conductive connection exists between current sensor 722 (which may be formed as a low voltage printed circuit assembly) and generator power circuits (generally requiring high current mechanical connections at junctures). The current in winding 724, i.e., the current responsive to the voltage across winding 724 (e.g., the algebraic difference between signals PHA and RTN), flows in wire 736 as a primary (e.g., one turn) of a transformer formed with current sensing coil L102 as the secondary. Current in wire 736 induces current in current sensing coil L102 by transformer operation. Alternating current in coil 102 is half-wave rectified by diode D106. Reverse current in coil L102 is conducted by diode D104. The cathode of diode D106 supplies a rectified signal (the voltage magnitude of signal CSV) to comparator circuit 742. The rectified signal is filtered by parallel connected resistor R110 and capacitor C108.

Comparator circuit 742 and driver circuit 743 respectively determine and provide a signal when system 950 is providing less than a predetermined output power. For example, voltage divider 741 defines a threshold voltage (signal RV) by dividing a reference potential (e.g., 12 volts DC on line 730) according to a resistance ratio of resistors R112 and R114. Voltage comparator 740 receives signal RV on its positive input and receives signal CSV on its negative input. When the voltage magnitude of signal RV exceeds the voltage magnitude of signal CSV, comparator 740 drives the base of transistor Q130 (biased by resistors R120 and R122) to drive the gate of MOSFET Q132 so to assert the low-elect-pwr-demand signal on line 923 as discussed above. In other words, when more than a minimal amount of electric power is being supplied by system 950, signal low-elect-pwr-demand is not asserted.

Components of system 10, 100, or 950 may be arranged in a hand truck for portability. Various sizes and arrangements according to various aspects of the present invention provide relative stability on a surface (e.g., level ground), relatively long operating time, and relatively high capacity for supplying electrical power and compressed air. The hand truck may include a frame and four wheels mounted on two parallel horizontal axles, one axle being near the engine; a frame and three wheels arranged with one wheel on an axle near the engine and two wheels on a second axle; a frame with two wheels on one axle near the engine and one wheel on a second axle; a frame with two wheels on one axle near the engine and a footing to support the frame when stationary; or a frame with one wheel on one axle near the engine and a footing to support the frame when stationary. In arrangements having a footing, the axle near the engine generally operates as a pivot when lifting the footing for moving the hand truck. Advantageously, the center of gravity of the engine is placed near an axle and preferably near a pivot. The distance from a reference axis (e.g., through the axle near the engine or pivot) to the center of gravity of the engine is made less than (a) the distance from the center of gravity of the fuel tank to the reference axis and (b) the distance from the center of gravity of the reservoir or air tanks to the reference axis.

For example, portable system 260 includes a frame 240, a fuel tank 246, a reservoir system 146 (having horizontal, cylindrical air tanks 156, 158, and 160 arranged vertically), a compressed air service panel 155 located horizontally between fuel tank 246 and air tank 156, compressor 142 with fly wheel 170, an engine 102 with shaft-mounted generator 104 and sheave 166, and a belt 168 as discussed above. Frame 240 includes footing 238, axle 244, and two wheels on the ends of axle 244 (the near wheel not shown for clarity of presentation). To move hand truck 260, an operator lifts handle 255 to lift footing 238 off the ground, pivoting frame 240 on the axis 245 of axle 244.

Engine 102, generator 104, and sheave 166 have a combined center of gravity 252 that is a minimum distance 253 from axis 245. This distance is defined perpendicular to axis 245. When fuel tank 246 is full (e.g., approx. five gallons of gasoline), its center of gravity 248 is a distance 249 from axis 245. When air tanks of reservoir system 146 are full, the air tanks center of gravity 250 is a distance 251 from axis 245. Note that distance 253 is less than distance 249; and distance 249 is less than distance 251.

Air tanks 156, 158 and 160 (e.g., elongated cylinders with hemispherical or flat ends) are arranged with parallel axes of cylindrical symmetry generally in one vertical plane. Alternately, several tanks may be arranged with axes in two or more vertical planes (e.g., stacking like a package of cigarettes resting on its side). A portion of vertically lowermost tank 160 is below the horizontal plane that includes axis 244 by a distance DT.

In an alternate arrangement, handle 255 is provided at the end of hand truck 260 close to axis 244. Movement of hand truck 260 in such an arrangement allows lifting footing 238 off the ground by downward pressure on handle 260.

The engine may drive the generator without having the generator mounted on the engine's shaft. In such an implementation, components of system 10, 100, or 950 may be arranged according to various aspects of the present invention as discussed above. For example, hand truck 340 of FIGS. 18–20 includes a frame 342 having handles 344, 345 and footing 360; compressor 372; engine 374; generator 376; fuel tank 354; reservoir 346; and wheels 356 mounted on an axle for rotation about axis 358. Handles 344 and 345 may be used to lift footing 360 off a supporting surface (e.g., level ground) for rolling hand truck 340 on wheels 356. Fuel tank 354 may have a capacity of about five gallons and supplies fuel to engine 374. Reservoir 346 includes air tanks 347, 348 and 349 (e.g., elongated cylinders with hemispherical or flat ends) arranged with parallel axes of cylindrical symmetry generally in one vertical plane. Alternately, several tanks may be arranged with axes in two or more vertical planes as discussed above. A portion of vertically lowermost tank 160 is below the horizontal plane that includes axis 358 by a distance DT in FIG. 19. A drive train coupling engine 374 to compressor 372 and generator 376 includes a first conventional belt (not shown) coupling sheave 351 of engine 374 to fly wheel 352 or compressor 372; and a second conventional belt (not shown) coupling sheave 351 to sheave 350 of generator 376.

Figure 19:
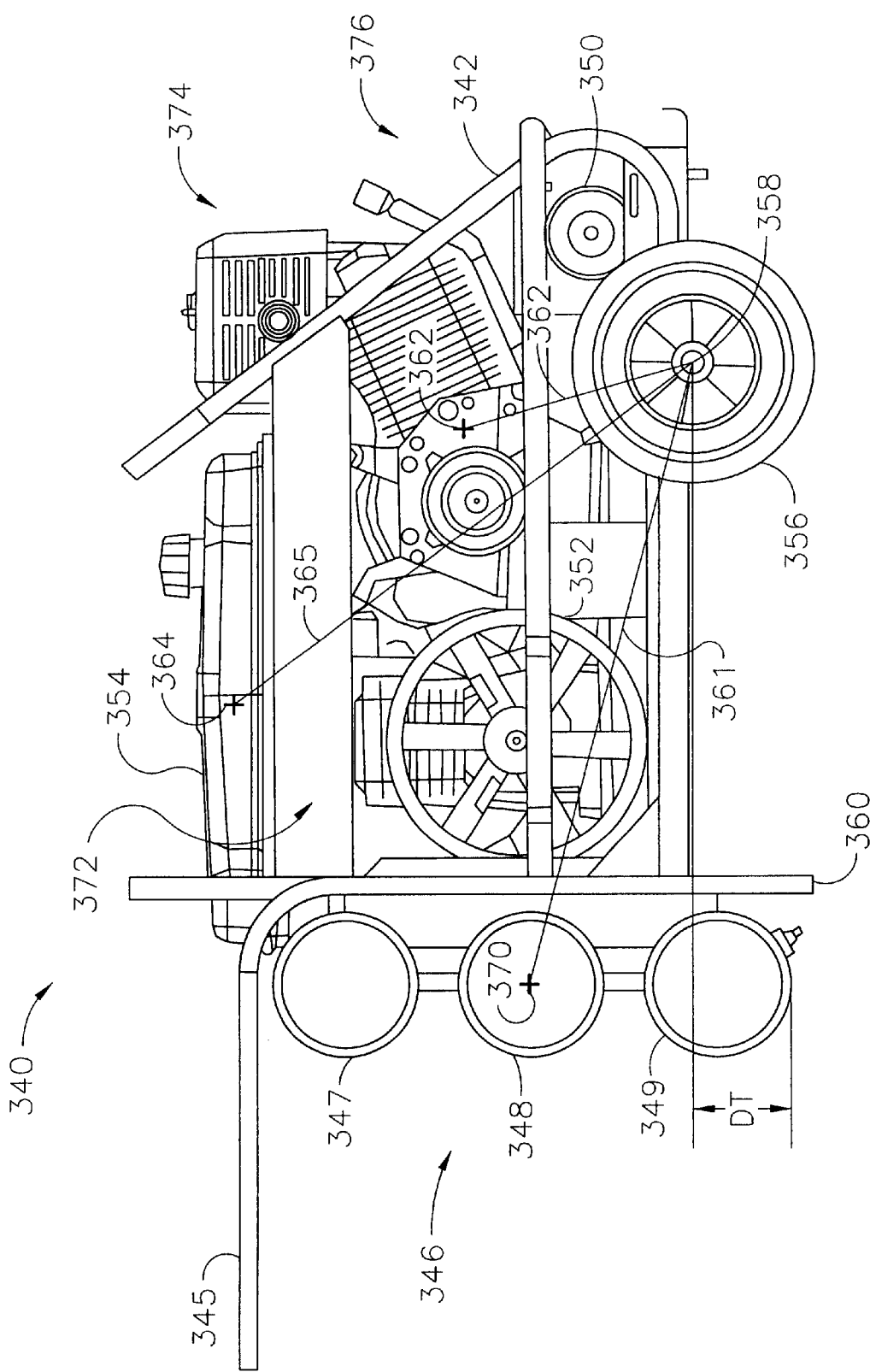
FIG. 19 is a right side plan view of the system of FIG. 18.
Figure 20:
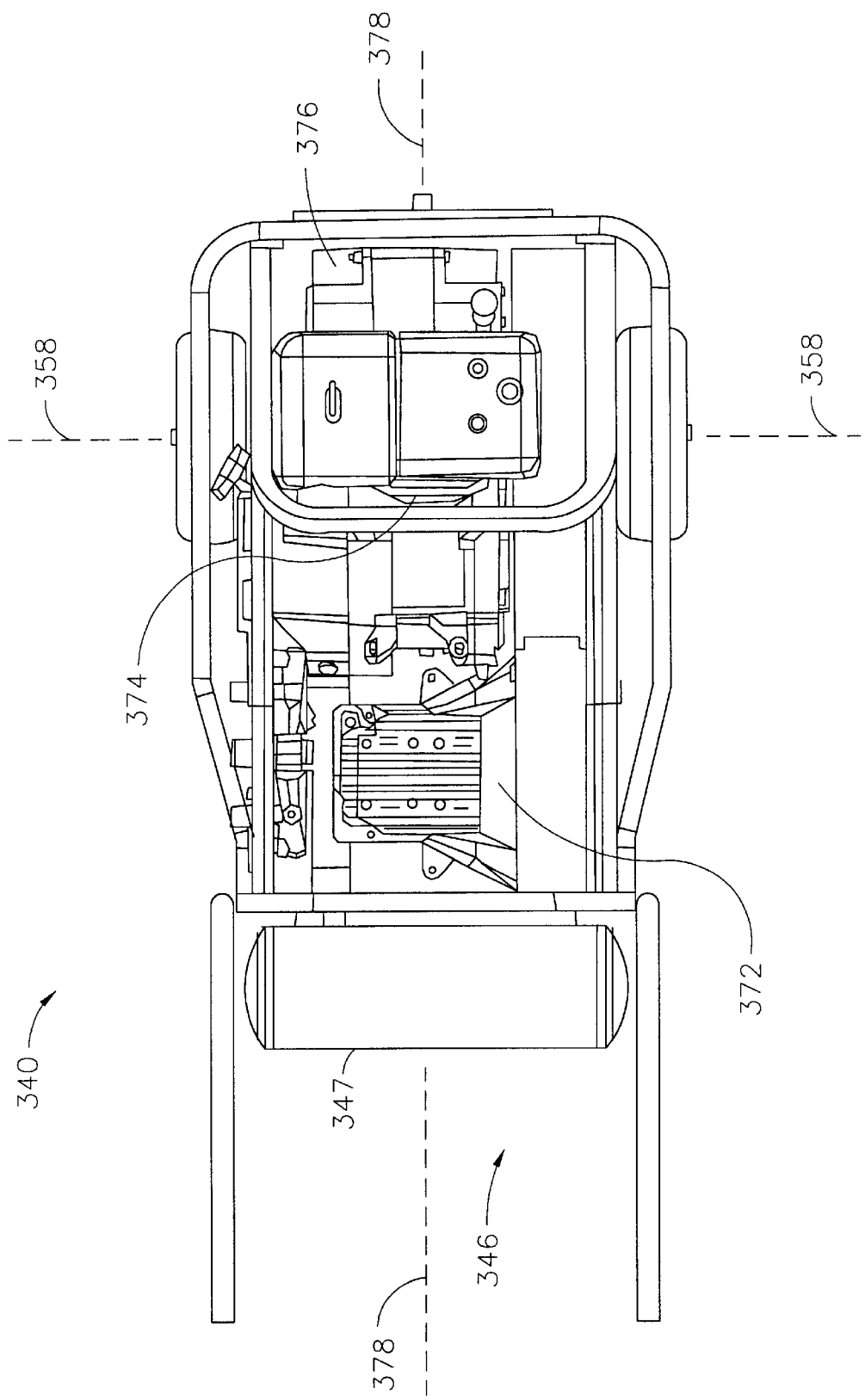
FIG. 20 is a top plan view of the system of FIG. 18.

Engine 374 has a center of gravity 362 that may be located generally as shown in FIG. 19 at a distance 363 from axis 358. Fuel tank 354, when filled to capacity, has a center of gravity 364 that may be located generally as shown in FIG. 19 at a distance 365 from axis 358. Air tanks 347–349, when filled to capacity, have a center of gravity 360 that may be located generally as shown in FIG. 19 at a distance 361 from axis 358. These centers of gravity may be located in various vertical planes perpendicular to axis 358 (e.g., at various horizontal positions, or all in one vertical plane 378 that includes the center of gravity of hand truck 340). Note that distance 363 is less than distance 365; and distance 365 is less than distance 361.

The foregoing is a description of preferred exemplary embodiments and best mode of the invention known to the applicant at the time of filing the application. The invention is not limited to the specific forms shown. For example, modifications may be made in the design and arrangement of the elements within the scope of the invention, as expressed in the appended claims.

What is claimed is:

1. A system that supplies electrical power and compressed air, the system comprising:
    a. an engine comprising a throttle having a first position for relatively higher speed and a second position for relatively lower speed;
    b. a compressor in mechanical communication with the engine for receiving operative power;
    c. a generator in mechanical communication with the engine for receiving operative power, the generator for supplying the electrical power;
    d. a reservoir in fluid communication with the compressor to receive air compressed by the compressor, compressed air being supplied from the reservoir; and
    e. a controller that moves the throttle from the first position to the second position in response-to sensing a magnitude of the supplied electrical power and sensing a pressure of air in the reservoir; wherein the controller comprises a current sensor electrically coupled to at least a portion of the supplied electrical power, the current sensor providing a first signal in response to the portion of supplied electrical power, the controller moving the throttle in further response to the first signal.

2. A system that supplies electrical power and compressed air, the system comprising:
    a. an engine comprising a throttle having a first position for relatively higher speed and a second position for relatively lower speed;
    b. a compressor in mechanical communication with the engine for receiving operative power;
    c. a generator in mechanical communication with the engine for receiving operative power, the generator for supplying the electrical power;
    d. a reservoir in fluid communication with the compressor to receive air compressed by the compressor, compressed air being supplied from the reservoir; and
    e. a controller that moves the throttle from the first position to the second position in response to sensing a magnitude of the supplied electrical power and sensing a pressure of air in the reservoir; wherein the controller comprises a pneumatic cylinder in mechanical communication with the throttle for moving the throttle.

3. The system of claim 2 wherein the controller further comprises a valve operative in response to a magnitude of the supplied electrical power for supplying compressed air to the cylinder to move the cylinder.

4. The system of claim 3 wherein the valve is coupled to the reservoir to supply compressed air from the reservoir to the cylinder.

5. The system of claim 3 wherein the controller further comprises a current sensor electrically coupled to at least a portion of the supplied electrical power, the current sensor providing a first signal in response to the portion of supplied electrical power, the first signal being coupled to the valve to operate the valve to supply air to the cylinder.

6. A system that supplies electrical power and compressed air, the system comprising:
    a. an engine comprising a throttle having a first position for relatively higher speed and a second position for relatively lower speed;
    b. a compressor in mechanical communication with the engine for receiving operative power;
    c. a generator in mechanical communication with the engine for receiving operative power, the generator for supplying the electrical power;
    d. a reservoir in fluid communication with the compressor to receive air compressed by the compressor, compressed air being supplied from the reservoir; and
    e. a controller that moves the throttle from the first position to the second position in response to sensing a magnitude of the supplied electrical power and sensing a pressure of air in the reservoir; wherein the controller further comprises:
        (1) a current sensor electrically coupled to at least a portion of the supplied electrical power, the current sensor providing a first signal in response to the portion of supplied electrical power;
        (2) a solenoid in mechanical communication with the throttle for moving the throttle when actuated by a control signal; and
        (3) a pressure actuated switch that provides the control signal to the solenoid in response to receiving the first signal while detecting that air pressure of the reservoir exceeds a limit.

7. A system that supplies electrical power and compressed air, the system comprising:
   a. a support for maintaining the system on a provided surface;
   b. an engine mechanically coupled to and supported by the support;
   c. a compressor in mechanical communication with the engine for receiving operative power, the compressor mechanically coupled to and supported by the support;
   d. a generator in mechanical communication with the engine for receiving operative power, the generator mechanically coupled to and supported by the support, the generator in operation supplying the electrical power; and
   e. a reservoir in fluid communication with the compressor to receive air compressed by the compressor; the reservoir mechanically coupled to and supported by the support, compressed air being supplied from the reservoir, the reservoir comprising a plurality of cylindrical tanks in fluid communication, a first tank of the plurality being further from the surface than a second tank of the plurality.

8. The system of claim 7 wherein the reservoir has a first center of gravity a first distance from the surface, and the engine has a second center of gravity a second distance from the surface, the second distance being shorter than the first distance.

9. The system of claim 7 wherein a first vertical distance measured from the surface to a portion of the engine nearest the surface is greater than a second vertical distance measured from the surface to a portion of the reservoir nearest the surface.

10. The system of claim 7 wherein the support pivots around a horizontal axis to facilitate movement of the system along the surface; and a portion of the engine nearest the axis is closer to the axis than a portion of the reservoir nearest the axis.

11. The system of claim 7 wherein:
   a. the system further comprises a fuel tank in fluid communication with the engine for supplying operative fuel to the engine;
   b. the support pivots around a horizontal axis to facilitate movement of the system along the surface; and
   c. a portion of the engine nearest the axis is closer to the axis than a portion of the fuel tank nearest the axis.

12. The system of claim 7 wherein:
   a. the system further comprises a fuel tank in fluid communication with the engine for supplying operative fuel to the engine;
   b. the support pivots around a horizontal axis to facilitate movement of the system along the surface; and
   c. wherein the reservoir has a first center of gravity a first distance from the axis, and the engine has a second center of gravity a second distance from the surface, the second distance being shorter than the first distance.

13. A system that supplies electrical power and compressed air, the system comprising:
   a. an engine comprising a throttle;
   b. a throttle positioner for establishing a position of the throttle thereby effecting a rotational speed of the engine, the throttle positioner responsive to an electrical control signal;
   c. a compressor in mechanical communication with the engine for receiving operative power, the compressor supplying the compressed air;
   d. a generator in mechanical communication with the engine for receiving operative power, the generator comprising a first winding and a second winding, the second winding having a voltage proportional to the rotational speed of the engine;
   e. a regulator coupled to the first winding, the regulator supplying the electrical power at an output voltage different from a voltage of the first winding; and
   f. a circuit coupled to the second winding, the circuit providing the electrical control signal in response to the voltage of the second winding.

14. The system of claim 13 wherein:
   a. the engine further comprises a spark plug that provides a spark synchronously with a revolution of the engine; and
   b. the circuit further comprises a switch coupled to the spark plug for inhibiting provision of the spark.

15. The system of claim 13 wherein the regulator comprises:
   a. a rectifier coupled to the first winding that provides a rectified voltage; and
   b. an inverter that supplies the electrical power in response to the rectified voltage.

16. The system of claim 13 wherein:
   a. the circuit further comprises a controller that provides a rectifier control signal; and
   b. the rectifier provides the rectified voltage at a magnitude responsive to the rectifier control signal.

17. The system of claim 16 wherein the rectifier comprises a silicon controlled rectifier and a gate of the silicon controlled rectifier operates in response to the rectifier control signal for firing angle control.

18. A method for operating a system that supplies electrical power and compressed air to increase engine speed in response to demand for compressed air, the method comprising:
   reducing a load presented by a drive system to an engine, the system comprising the engine, a compressor, and the drive system, the engine selectively loaded by the compressor via the drive system to supply compressed air;
   increasing a speed of the engine by operating a throttle of the engine; and
   increasing the load presented by the drive system to the engine to increase provision of compressed air by the system.

19. The method of claim 18 further comprising:
   before the step of increasing engine speed, reducing electrical power supplied by the system; and
   after the step of increasing the load, increasing electrical power supplied by the system.

20. A method for operating a system that supplies electrical power and compressed air to increase engine speed in response to demand for electrical power, the method comprising:
   reducing a load presented by a drive system to an engine, the system comprising the engine, a compressor, and the drive system, the engine selectively loaded by the compressor via the drive system to supply compressed air;
   increasing a speed of the engine by operating a throttle of the engine; and
   supplying electrical power to meet the demand.

21. The method of claim 20 further comprising after the step of supplying electrical power to meet the demand, increasing the load presented by the drive system to the engine to supply compressed air to meet a demand for compressed air.

22. A system that supplies electrical power and compressed air, the system comprising:
   a. an engine;
   b. a compressor in mechanical communication with the engine for receiving operative power;
   c. a generator in mechanical communication with the engine for receiving operative power, the generator for supplying the electrical power; and
   d. a reservoir in fluid communication with the compressor to receive air compressed by the compressor, an outlet of the reservoir supplying the compressed air, the reservoir comprising:
      (1) a regulator for regulating the pressure of the compressed air provided at the outlet; and
      (2) a plurality of tanks in fluid communication with the compressor and with the outlet, wherein the regulator is in fluid series arrangement between two tanks of the plurality.

* * * * *